US012803814B2

(12) United States Patent
Fukuda et al.

(10) Patent No.: US 12,803,814 B2
(45) Date of Patent: Nov. 17, 2026

(54) DIGITAL SIGNATURE SYSTEM, AND METHOD

(71) Applicant: NEC Corporation, Tokyo (JP)

(72) Inventors: Haruna Fukuda, Tokyo (JP); Toshiyuki Isshiki, Tokyo (JP); Saki Otsuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 79 days.

(21) Appl. No.: 18/808,247

(22) Filed: Aug. 19, 2024

(65) Prior Publication Data

US 2025/0070985 A1 Feb. 27, 2025

(30) Foreign Application Priority Data

Aug. 24, 2023 (JP) ................................ 2023-136682

(51) Int. Cl.
*H04L 9/00* (2022.01)
*H04L 9/32* (2006.01)

(52) U.S. Cl.
CPC .......... *H04L 9/3247* (2013.01); *H04L 9/3231* (2013.01)

(58) Field of Classification Search
CPC ... H04L 9/3231; H04L 9/3247; H04L 9/3255; G06F 21/32
USPC ........................................................ 713/176
See application file for complete search history.

(56) References Cited

U.S. PATENT DOCUMENTS 5,825,880 A * 10/1998 Sudia ...................... G06F 21/64 713/180
6,209,091 B1 * 3/2001 Sudia ................ G06Q 20/3829 705/76
9,485,098 B1 * 11/2016 Lepeshenkov .......... G06F 21/62
9,979,551 B2 * 5/2018 Joye ........................ H04L 9/008
2014/0019766 A1 1/2014 Takahashi et al.
2016/0094348 A1 * 3/2016 Takahashi ............ H04L 9/3231 713/176
2017/0264436 A1 * 9/2017 Mohassel ............ H04L 63/0838
2022/0038291 A1 2/2022 Hong et al.
2022/0405369 A1 12/2022 Takahashi

FOREIGN PATENT DOCUMENTS

JP 2010-239294 A 10/2010
JP 5707311 B2 4/2015
JP 5907830 B2 4/2016
(Continued)

OTHER PUBLICATIONS

Yevgeniy Dodis, et al. “Fuzzy Extractors: How to Generate Strong Keys from Biometrics and Other Noisy Data”, SIAM Journal on Computing, 38(1):97-139, Jan. 20, 2008.
(Continued)

*Primary Examiner* — Josnel Jeudy

(57) ABSTRACT

A first processing apparatus in a digital signature system receives a first parameter generated using a first signing key and first biometric information; a second parameter generated using a second signing key and second biometric information; and a second signature generated with the second signing key for a message. Using at least the first parameter, the second parameter, and the second signature received, the first processing apparatus computes a first signature for the message that is able to be verified using a first verification key corresponding to the first signing key.

15 Claims, 15 Drawing Sheets

(56) References Cited

FOREIGN PATENT DOCUMENTS

| | | | | |
|---|---|---|---|---|
| JP | 6096893 | B2 | 3/2017 | |
| JP | 2021-508427 | A | 3/2021 | |
| JP | 2021-087167 | A | 6/2021 | |
| JP | 2023-000782 | A | 1/2023 | |
| WO | WO-2012025866 | A1 * | 3/2012 | ........... H04L 9/3073 |

OTHER PUBLICATIONS

David Derler, et al., "Key-Homomorphic Signatures: Definitions and Applications to Multiparty Signatures and Non-Interactive Zero-Knowledge", Designs, Codes and Cryptography 87, 1372-1413, 2019.

* cited by examiner

DIGITAL SIGNATURE SYSTEM, AND METHOD

CROSS REFERENCE TO RELATED APPLICATIONS

This application is based upon and claims the benefit of the priority of Japanese patent application No. 2023-136682, filed on Aug. 24, 2023, the disclosure of which is incorporated herein in its entirety by reference thereto.

FIELD

The present disclosure relates to a digital signature system and a method.

BACKGROUND

Digital signature is a technology which enables to verify a creator of an electronic document and check that the document has not been altered after creation thereof.

Algorithm of Digital Signature

The following outlines one of typical algorithms of digital signature.

Key Generation

Key generation algorithm Key Gen( ) generates a pair of a signing key (secret key) sk and a verification key (public key) vk.

$$(sk, vk) \leftarrow KeyGen(1^{\kappa}) \quad (1)$$

where, $\kappa$ is a security parameter.

Instead of directly receiving a security parameter, the key generation algorithm KeyGen( ) may receive public parameters which a setup algorithm has generated from the security parameter, and generate a pair of the signing key (secret key) sk and the verification key (public key) vk, in some cases.

Signing

Generating a signature $\sigma$ for a message (document) M with the signing key sk. That is, the signature $\sigma$ is generated with the signing key (secret key) sk for the message (document) M to be signed or a hash value (message digest) which is obtained as an output of a hash function to which the message M to be signed is supplied as an input.

$$\sigma \leftarrow \text{Sign}(sk, M) \quad (2)$$

Verification

Verifying the signature $\sigma$ for the message (document) M (i.e., verifying correctness the message (document) M and the signature $\sigma$) using the verification key vk.

$$0/1 \leftarrow \text{Verify}(vk, M, \sigma) \quad (3)$$

where Verify ( ) is assumed to return (output) 1 for acceptance and return (output) 0 for non-acceptance (rejection), though not limited thereto.

In digital signature, when a public key is made public, those who obtain a document and a signature can perform verification of the signature for the document (message). That is, using a verification key, which is a public key, it is possible to verify whether or not the signature has been generated for the document (message) with the signing key. Digital signatures may be used for a variety of applications, such as e-mail protection (S/MIME (Secure/Multipurpose Internet Mail Extensions)) and electronic contracts. For example, a digital signature may be used as a contractor's signature to electronic contract data instead of a seal in a written contract. In a case of virtual currency remittance, a message which includes information on "to which address and how much to remit" and a sender's digital signature for the message may be recorded in a blockchain. The remittance process may be completed when the signature is successfully verified.

In digital signature, when a signing key is lost or stolen, security could be compromised. It is difficult for a user to properly manage a signing key. When a signing key is not properly managed, there is a risk that the signing key may be lost or stolen. Improper management of a signing key may lead to preventing a "signer" to generate a correct signature (e.g., when the signing key is lost) or allowing someone other than a "signer" to generate a correct signature (e.g., when the signing key is stolen).

Security for digital signature is based on that a signing key is managed to be kept in secret. An adversary, once obtaining the signing key, can generate a correct signature. That is, what digital signature guarantees is that "a person with a signing key has given a signature to a document," not that "a 'signer' has given a signature to a document. The larger the number of keys a user has to manage, the more difficult becomes management thereof.

A signature using biometric information in place of a key, can reduce a risk of losing the key as compared with digital signature. In Patent Literature (PTL) 1, a system is proposed that can generate a signature for any message (electronic using document) biometric information itself as a secret key, without requiring any data other than biometric information (secret data, auxiliary information, etc.).

[PTL 1] Japanese Patent No. 5707311

SUMMARY

In digital signature, a signature and a verification key may be made public. There are many use cases where signatures are verified by a third party. In PTL 1, etc., a verification key (biometric certificate) including information that depends on biometric information and a signature (biometric signature) including information that depends on biometric information are transmitted to a verification apparatus. In this case, there is a concern that at least a part of the biometric information could be leaked from the information that depends on the biometric information.

An object of the present disclosure is to provide a system, a method and a non-transitory medium, each enabling to prevent leakage of biometric information, when a key and/or a signature is/are generated using information that depends on biometric information, to enhance security.

According to one of aspects of the present disclosure, there is disclosed a digital signature system including: a first processing apparatus that includes at least a first processor and a first communication interface, wherein the first processing apparatus is configured to execute processing comprising: receiving a first parameter generated using a first signing key and first biometric information; receiving a second parameter generated using a second signing key and second biometric information, and a second signature for a message generated with the second signing key; and using at least the first parameter, the second parameter, and the second signature, computing a first signature for the message, wherein the first signature is able to be verified using a first verification key corresponding to the first signing key.

According to one of aspects of the present disclosure, there is disclosed a digital signature method including:

- receiving, by a first node, a first parameter generated using a first signing key and first biometric information,
- a second parameter generated using a second signing key and second biometric information, and
- a second signature for a message generated with the second signing key; and,
- computing, by the first node, a first signature for the message, using at least the first parameter, the second parameter, and the second signature, wherein the first signature is able to be verified using a first verification key corresponding to the first signing key.

According to one of aspects of the present disclosure, there is disclosed a non-transitory computer-readable medium storing a program causing a computer to execute processing including:

- receiving a first parameter generated using a first signing key and first biometric information,
- a second parameter generated using a second signing key and second biometric information, and
- a second signature for a message generated with the second signing key; and,
- computing a first signature for the message, using at least the first parameter, the second parameter, and the second signature, wherein the first signature is able to be verified using a first verification key corresponding to the first signing key.

According to the present disclosure, it is possible to increase security by preventing leakage of biometric information for a key and/or a signature generated using information that depends on the biometric information.

DETAILED DESCRIPTION

In the following description of examples and embodiments, reference is made to the accompanying drawings which form a part hereof, and in which it is shown by way of illustration specific examples that can be practiced. It is to be understood that other examples can be used and structural changes can be made without departing from the scope of the disclosed examples. It is noted that in the disclosure, the expression "at least one of A and B" means A, B, or (A and B). The term expressed as "—(s)" includes both singular and/or plural form.

Figure 1:
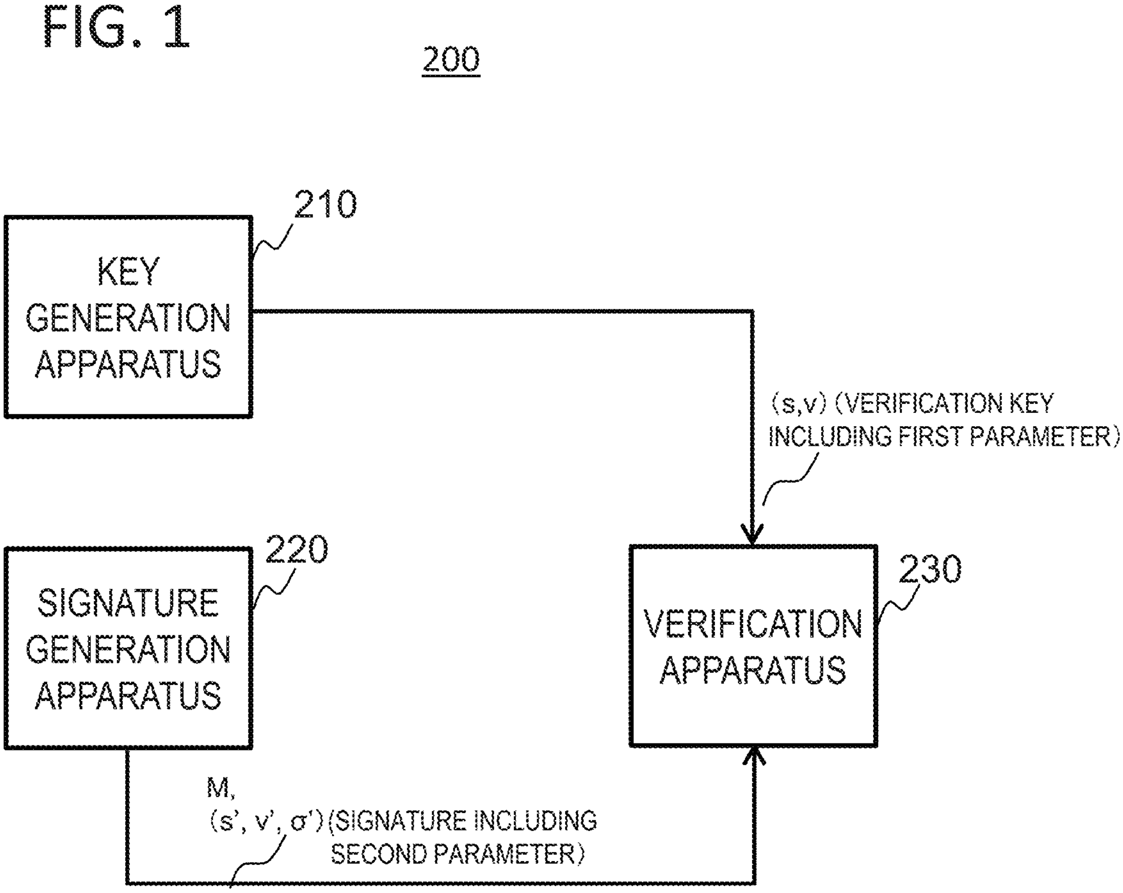
FIG. 1 is a diagram illustrating a comparative example.

First, referring to FIG. 1, a comparative example is described. FIG. 1 is newly created to help understand a premise of the present disclosure. The comparative example of FIG. 1 might be made to correspond to a disclosure of PTL 1, for example. Referring to FIG. 1, a signature system (biometric signature system) 200 of the comparative example includes a key generation apparatus 210, a signature generation apparatus 220, and a verification apparatus 230. The key generation apparatus 210 generates a pair of a first signing key x and a first verification key v and generates a first parameter s (also referred to as a "commitment for registration") using a biometric information for registration (first biometric information) w and the first signing key x to transmit a verification key (s, v) (also referred to as a "biometric certificate") including the first parameter s to the verification apparatus 230. The signature generation apparatus 220 generates a pair of a second signing key x' and a second verification key v', generates a second signature σ' using the second signing key x' for a message M, and generates a second parameter s' (also referred to as a "commitment for signing") using a biometric information for signing (second biometric information) w' and the second signing key x' to transmit the message M and a signature (s', v' σ') (also referred to as a "biometric signature") including the second parameter s' to the verification apparatus 230. The verification apparatus 230 verifies whether or not a pair of the message M and the second signature σ' is correct using the second verification key v' and also verifies whether or not a difference between the first signing key x and the second signing key x' corresponds to a relation between the first verification key v and the second verification key v', where the difference between the first signing key x and the second signing key x' is calculated using the first parameters s and the second parameter s'.

Figure 2:
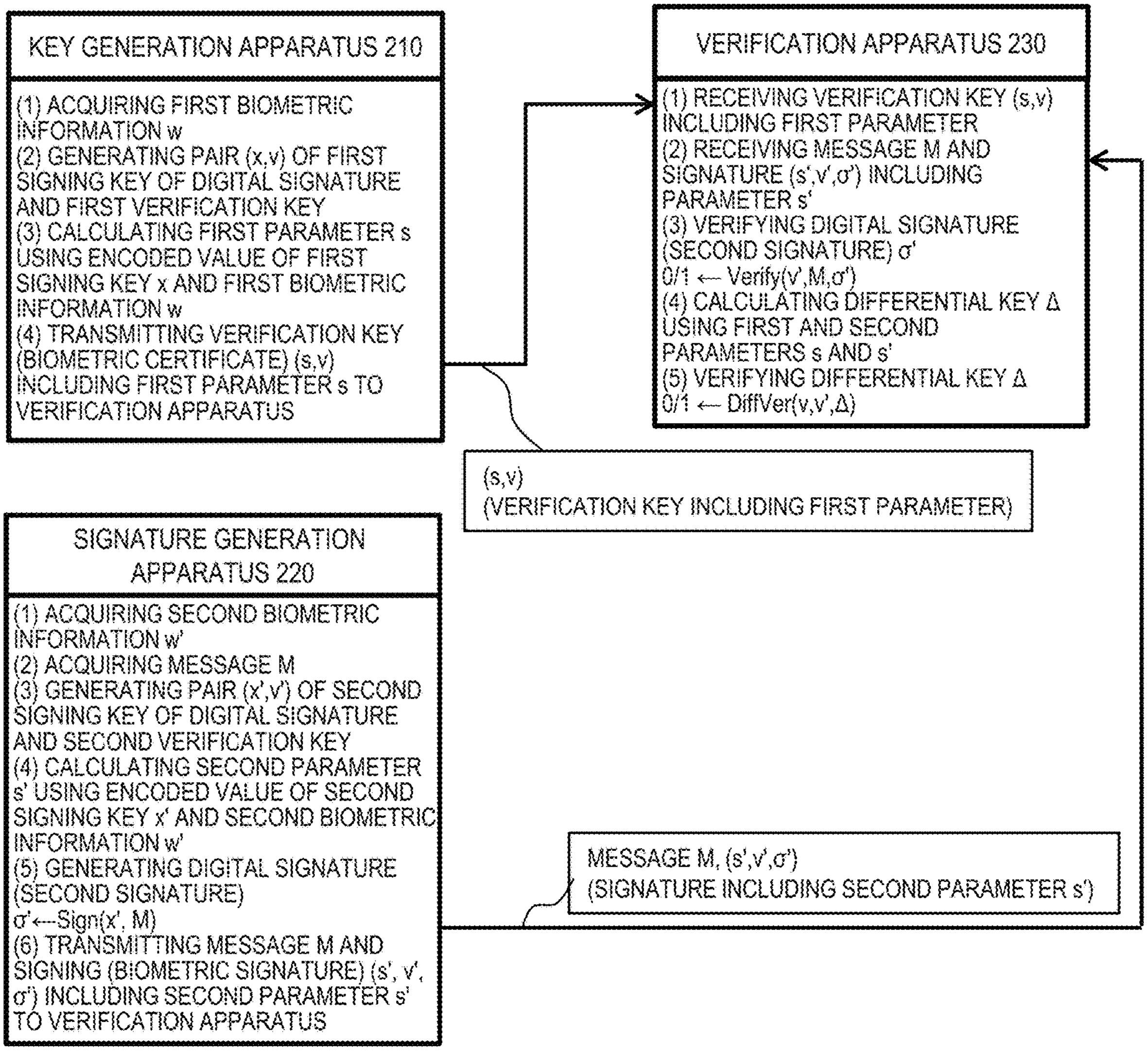
FIG. 2 is a diagram illustrating operation process in the comparative example.

FIG. 2 illustrates one example of operation process in the apparatuses in FIG. 1. The key generation apparatus 210 acquires biometric information for registration (first biometric information) w (step 1). The key generation apparatus 210 generates a pair (x, v) of a first signing key x and a first verification key v (step 2). The key generation apparatus 210 supplies, as an input, the first signing key x to an encoding function ENC to obtain an encoded value ENC(x) and computes a first parameter s using the ENC(x) and the biometric information for registration (first biometric information) w (step 3). The key generation apparatus verification key (s, v) (biometric 210 transmits certificate) including the first parameter s (information that depends on biometric information) to the verification apparatus 230 (step 4).

The signature generation apparatus 220 acquires biometric information for signing (second biometric information) w' (step 1). The signature generation apparatus 220 acquires a message M (electronic document) to be signed (step 2). The signature generation apparatus 220 generates a pair of a second signing key x' and a second verification key v' (step 3). The signature generation apparatus 220 supplies, as an input, the second signing key x' to an encoding function ENC to obtain an encoded value ENC (x') and computes a second parameter s' using the ENC (x') and the biometric information for signing (second biometric information) w' (step 4). The signature generation apparatus 220 generates a second signature σ' (=Sign (x', M) that is a digital signature for the message M generated using the second signing key x' (step 5). The signature generation apparatus 220 transmits the message M and a signature (s', v', σ') including the second parameter s', the second verification key v', and the second signature σ' (step 6).

The verification apparatus 230 receives the verification key (s, v) (biometric certificate) including the first parameter s (information that depends on the first biometric information w) (step 1). The verification apparatus 230 receives the signature (s', v', σ') including the second parameter s' (information that depends on the second biometric information w') and the message M (step 2).

The verification apparatus 230 verifies a correctness of a pair of the message M and the digital signature (second signature) σ', using second verification key v' (step 3).

$$0/1 \leftarrow \mathrm{Verify}(v', M, \sigma') \tag{4}$$

The verification apparatus 230 computes a key difference (differential key) Δ between the first signing key x and the second signing key x', using the first parameter s and the second parameter s' (step 4).

$$\Delta \leftarrow Diff(s, s') \tag{5}$$

where Diff is a function that receives s and s' as input arguments and returns a difference between the first signing key x and the second signing key x'.

The verification apparatus 230 verifies whether or not a correspondence between the key difference (differential key) Δ which is a difference between the first signing key x and the second signing key x', and the first verification key v and the second verification key v' (e.g., a difference between v and v') is correct (step 5).

$$0/1 \leftarrow DiffVer(v, v', \Delta) \tag{6}$$

DiffVer is a function that returns 1 if the correspondence between the differential key Δ, and the first verification key v and the second verification key v' (e.g., a difference between v and v') is correct, and 0 otherwise.

These apparatuses may be communicatively connected via a network (e.g., at least one of a wired LAN (Local Area Network), a wireless LAN, a WAN (Wide Area Network), a mobile communication network, a virtual network, etc.).

In PTL 1, a biometric certificate T includes a set of data of user ID, public key KPe, commitment for registration Ce, and S (T=(ID, KPe, Ce, S)). S is an electronic signature for a pair of the user ID and the biometric public key (KPe, Ce). In FIG. 2, the biometric certificate is denoted as (s, v), where s and v may correspond to the commitment for registration Ce and the public key KPe in the biometric certificate in PTL 1, respectively. In PTL 1, a biometric signature includes a set of data of (user ID, temporary public key KPs, commitment for signing Cs, and digital signature σ'). In FIG. 2, the biometric signature is denoted as (s', v', σ') where s' v' and σ' may correspond to the commitment for signing Cs, the temporary public key KPs and the digital signature σ' in the biometric signature in PTL 1, respectively.

The parameter s (the commitment for registration Ce) included in the biometric certificate and the parameter s' (the commitment for signing Cs) included in the biometric signature are both secure sketches. It is known that in a secure sketch, biometric information could be partially leaked. In block chains (public block chains), a signature and a verification key that are publicly stored in a ledger(s) should be information from which biometric information cannot be leaked. More specifically, information which is to be made public preferably does not depend on biometric information. In the above comparative example, in the (s', v', σ') (signature including parameter s') and in the verification key (s, v) (verification key including parameter s), both of which are transmitted to the verification apparatus, the first parameter s and the second parameter s' include information that depend on biometric information w and w', respectively. Accordingly, it may be said that a part of the biometric information could be leaked from the first parameter s and/or the second parameter s' when the first parameter s and/or the second parameter s' is/are made public.

According to reference literature 1, when predictability of random variable A (probability to guess the most likely value of A) is $\max_a \Pr[A=a]$, as a probability to predict a random value (e.g., guess a secret key), a min-entropy $H_\infty(A)$ is given as follows.

$$H_\infty(A) = -\log(\max_a Pr[A = a]) \tag{7}$$

A min-entropy of a probability distribution represents how many bits which are nearly uniform random could be extracted therefrom. A security property guarantees that for a distribution w (e.g., corresponding to biometric information of the present disclosure) on a metric space M with a min-entropy m, a value of w can be reconstructed with probability no greater than $2^\wedge(-\tilde{m})$ (where ^ is a power operator) by an adversary who observes s. That is, $$\tilde{H}_\infty(w|SS(w)) >= \tilde{m} \tag{8}$$

where a sketching procedure SS(w) generates a sketch (parameter) s from w (s←SS(w)), $\tilde{m}$ is called a residual (min-) entropy of the secure sketch, and $\tilde{H}_\infty$ is an average min-entropy. $\tilde{H}_\infty$ is a chance that an adversary succeeds in predicting A when the adversary finds out a value b of B, for random variables A and B. An average min-entropy of A given B $\tilde{H}_\infty(A|B)$ is defined as a logarithm of an average over B ($E_{b\leftarrow B}[\max_a \Pr[A=a|B=b]]$).

$\lambda=m-\tilde{m}$ is called an entropy loss of the secure sketch, where while m is a min-entropy of biometric information alone, $\tilde{m}$ is a min-entropy of the biometric information under a condition that an adversary knows the parameter s (sketch). If the adversary knows the parameter s, he/she could get $m-\tilde{m}$ bits of the biometric information. In a case of a code-offset based secure sketch (Hamming code) employed in a biometric signature scheme, $\tilde{m}$ is expressed as follows.

$$\tilde{m}=m-(n-k)f \quad (9)$$

Thus, about $\lambda=m-\tilde{m}=(n-k)f$ bits of information may be leaked. In Equation (9), f is $\log_2(|F|)$, nis a code length, and k is the number of information bits. Here, |F| is an order of field F. The Hamming distance space is given by $F^{\wedge n}$. The field F is {0,1}, for example.

In a code-offset based secure sketch, on input w (e.g., biometric information), by choosing a random x, a codeword c=C(x) is computed and SS(w) is a shift needed to get from c to w: (s←SS(w)=w−c). In a function Rec(w', s), which reconstructs w from s and w', c' is computed by subtracting a shift s from w' to get c by decoding c', and w is computed by shifting back s to c to get w=c+s. Note that because dis(w', w)≤t, so is a distance d(c', c) between c' and c.

Similar to the secure sketch described above, there is a possibility that a part of biometric information could be leaked if the commitments (above mentioned commitment for registration and/or commitment for signing) in which secret keys are encoded and embedded in the biometric information are made public. More specifically, using the signature and the verification key, each of which includes a parameter (information that depends on biometric information), as with the comparative example described with reference to FIG. 1 and FIG. 2, as a signature and a verification key to be recorded in a public ledger of a block chain would cause a security problem.

Figure 3:
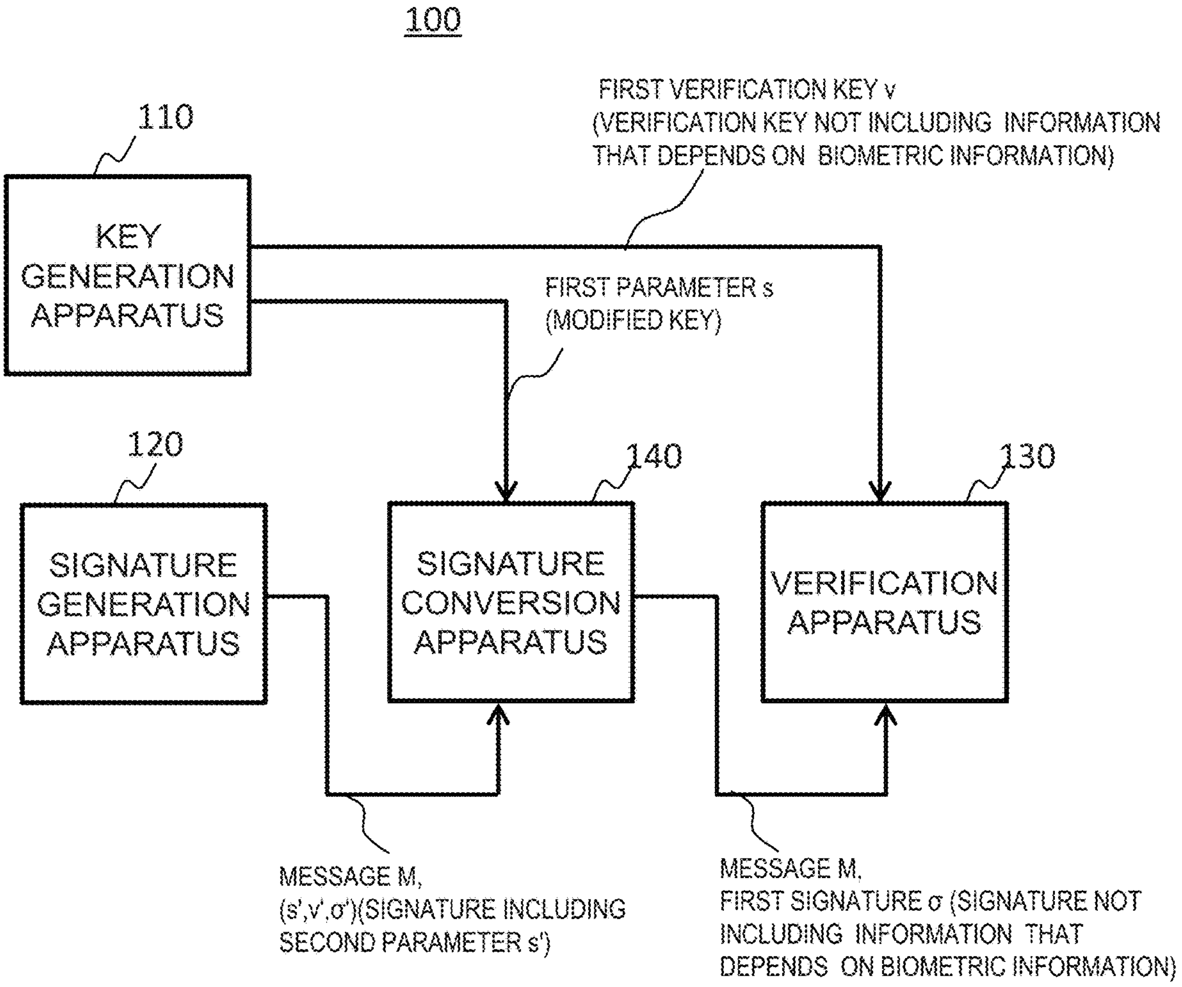
FIG. 3 is a diagram illustrating one of example embodiments of a present disclosure.

FIG. 3 is a diagram schematically illustrating an example of a digital signature system according to the present disclosure. Referring to FIG. 3, a digital signature system 100 includes a key generation apparatus 110, a signature generation apparatus 120, a verification apparatus 130, and a signature conversion apparatus 140.

The key generation apparatus 110 does not transmit a verification key (s, v) including information (first parameter s) that depends on biometric information to the verification apparatus 130. The key generation apparatus 110 transmits a first verification key v (where the first verification key v does not include information that depends on biometric information) to the verification apparatus 130. The key generation apparatus 110 transmits the first parameter s to the signature conversion apparatus 140 as a modified key (or an auxiliary key). A configuration may be possible in which the key generation apparatus 110 transmits the first verification key v to a Key-server (public key database; not shown), and the verification apparatus 130 retrieves the first verification key v from the Key-server (not shown).

While the signature generation apparatus 120 generates a signature (s', v', σ') (signature including the second parameter s'), which includes a second parameter s', a second verification key v', and a second signature σ' (digital signature), as with the signature generation apparatus 220 in FIG. 1, the signature generation apparatus 120 transmits the signature including the second parameter s' and a message M to the signature conversion apparatus 140, not to the verification apparatus 130.

The signature conversion apparatus 140 converts the second signature σ' to the first signature σ (which does not include information that depends on biometric information) based on the first parameter s received from the key generation apparatus 110 and the second parameter s' included in the signature (s', v', σ') received from the signature generation apparatus 120, wherein the second signature σ' is a signature for the message M generated using the second signing key x' and the first signature σ is a signature for the message M that is able to be verified with the first verification key v corresponding to the first signing key x. The signature conversion apparatus 140 transmits the message M and the first signature σ (which does not include information that depends on biometric information) to the verification apparatus 130.

The verification apparatus 130 verifies a correctness of the message M and the first signature σ received from the signature conversion apparatus 140, using the first verification key v received from the key generation apparatus 110.

$$0/1 \leftarrow \mathrm{Verify}(v, M, \sigma) \quad (10)$$

It is noted that in the signature conversion apparatus 140, a transmission destination of the first signature σ is not limited to the verification apparatus 130 but may be any other device or node not shown. That is, a pair of the first signature σ and the message M may also be transmitted to an other apparatus different than the verification apparatus 130 and stored therein, and then an apparatus that performs verification acquires a pair of the first signature σ and the message M stored in the other apparatus to verify the signature. It is possible that the apparatus that performs verification is the other apparatus itself. There is a time lag between generation and verification of the signature. Therefore, a plurality of signatures may be verified together. In a block chain network (P2P (peer to peer) network), for example, a procedure may be repeated, where the procedure includes transmitting a pair of a signature and a message to a nearest node, the pair of the signature and the message temporarily being stored in the nearest node, verifying, by the nearest node, the signature and the message, and propagating, by the nearest node, the signature to an other node if a verification result is acceptance. According to the present disclosure, the signatures, etc. publicly stored in a distributed ledger do not include a parameter that depends on biometric information, and thus no part of the biometric information could be leaked at a verification node or the like.

The signature generation apparatus 120 may be configured to receive an ID from a user to transmit (ID, s', v', σ') as a signature including the second parameter s' to the signature conversion apparatus 140 which may be configured to store and manage the first parameter s in association with an ID. Upon reception of a message and the signature including the second parameter s' from the signature generation apparatus 120, the signature conversion apparatus 140 may acquire the first parameter s corresponding to the ID.

Figure 4:
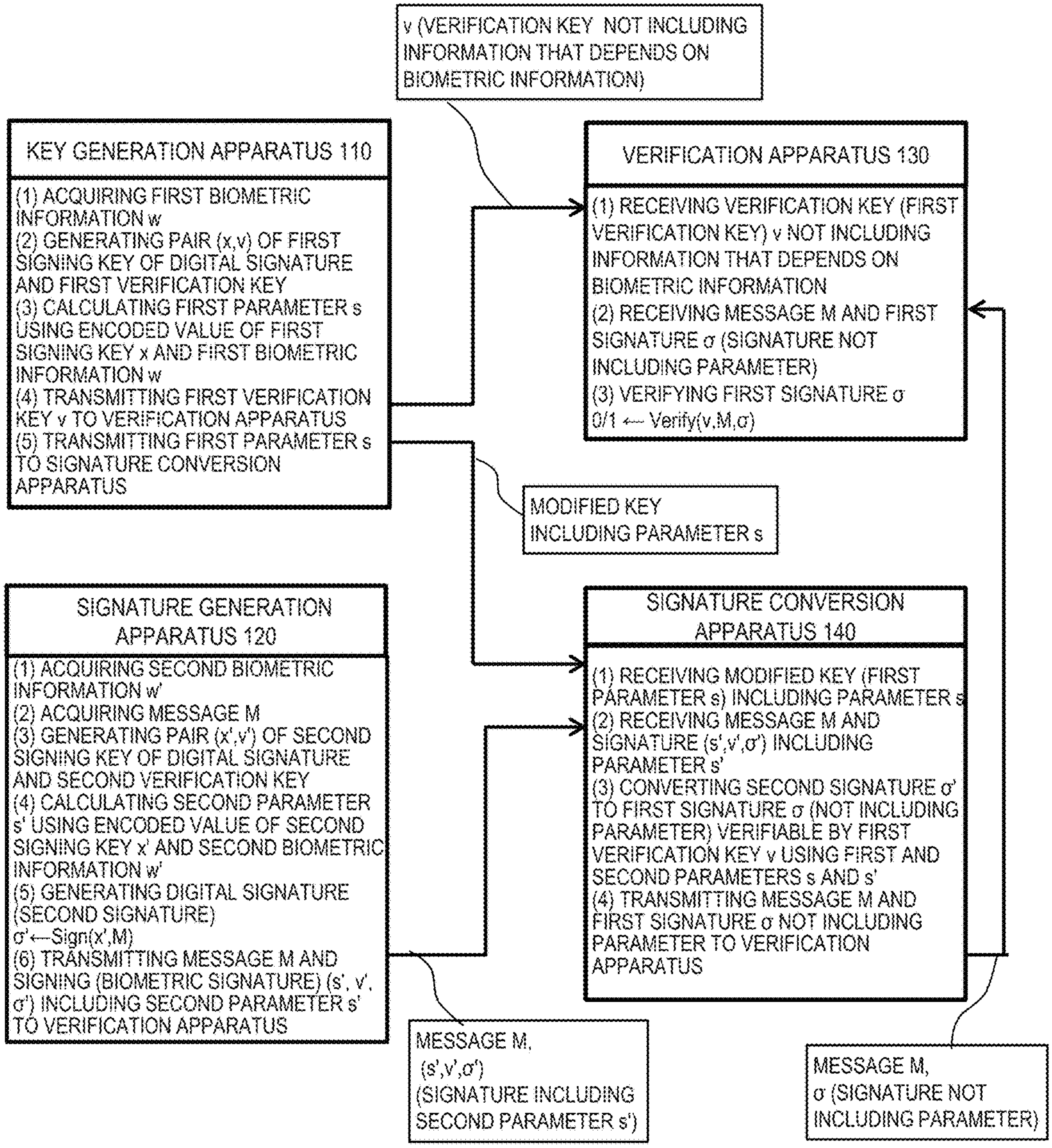
FIG. 4 is a diagram illustrating operation process in one of example embodiments of the present disclosure.

FIG. 4 illustrates one example of operation process in each of the apparatuses in FIG. 3. In the key generation apparatus 110, steps (1) to (3) are identical to those in FIG. 2, and thus the description thereof are omitted. The key generation apparatus 110 transmits the first verification key v to the verification apparatus 130 (step 4), and the first parameter s (modified key including a parameter) to the signature conversion apparatus 140 (step 5).

In the signature generation apparatus 120, step 1 to step 5 are identical to those in FIG. 2, and thus the description thereof is omitted. The signature generation apparatus 120 transmits the message M and the signature (s', v', σ') including the second parameter s' to the signature conversion apparatus 140 (step 6).

The signature conversion apparatus 140 receives the first parameter s (modified key including a parameter) from the key generation apparatus 110 (step 1). The signature conversion apparatus 140 receives the message M and the signature (s', v', σ') including the second parameter s' from the signature generation apparatus 120 (step 2). The signature conversion apparatus 140 converts the second signature σ' to the first signature σ (signature not including a parameter), using the first parameter s and the second parameter s' (step 3), where the second signature σ' is a signature for the message M generated using the second signing key x' and the first signature σ is a signature for the message M generated using the first signing key x.

The signature conversion apparatus 140 transmits the message M and the signature (first signature σ) not including a parameter to the verification apparatus 130.

The verification apparatus 130 receives the first verification key v from the key generation apparatus 110. The verification apparatus 130 receives the message M and the signature not including a parameter (first signature σ) from the signature conversion apparatus 140. The verification apparatus 130 verifies a correctness of the first signature σ and the message M, using the first verification key v (step 3).

Figure 5:
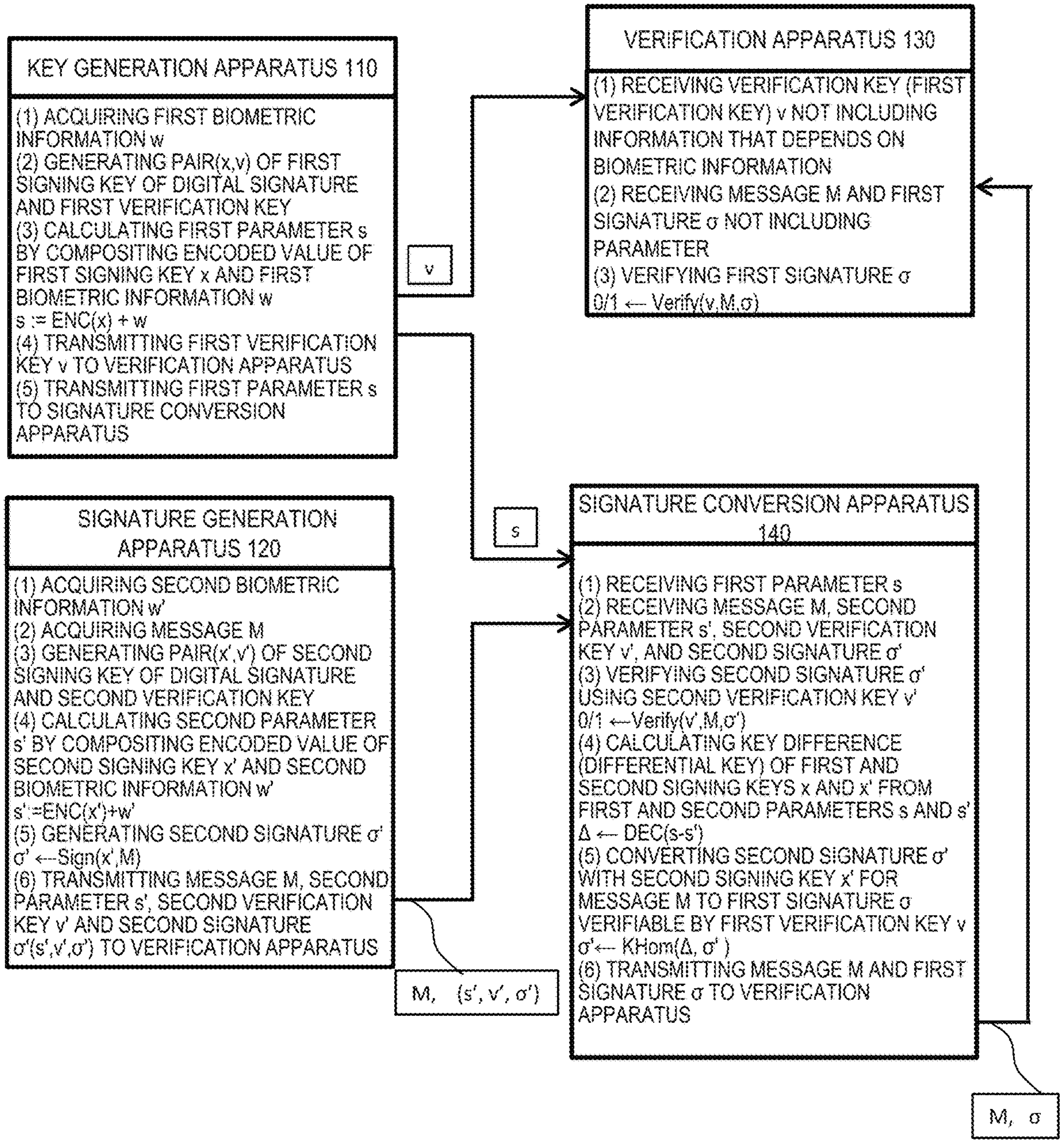
FIG. 5 is a diagram illustrating operation process in one of example embodiments of the present disclosure.

FIG. 5 illustrates one example of operation process in each of the apparatuses according to FIG. 4. The key generation apparatus 110 acquires first biometric information w (step 1).

The key generation apparatus 110 generates a secret key sk and a public key vk from a security parameter κ, using key generation algorithm KeyGen.

$$(sk, vk) \leftarrow KeyGen(1^{\kappa}) \tag{11}$$

A setup algorithm Setup of the relevant digital signature scheme may be performed in advance by the key generation apparatus 110 or any apparatus (or node) not shown other than the key generation apparatus 110, which is configured to determine a parameter pp in advance according to the security parameter κ to make the parameter pp public to a user.

$$pp \leftarrow \mathrm{Setup}(1^{\kappa}) \tag{12}$$

The parameter pp which may include information on a group, a hash function, etc., is common to a system and termed as a public parameter. The setup may be performed before system operation, for example, and each apparatus 110, 120, 130, 140 of the digital signature system 100 may use (share) the public parameter pp.

$$(sk, vk) \leftarrow KeyGen(pp) \tag{13}$$

The key generation algorithm KeyGen may be configured to return a pair of a secret key sk and a public key vk as a return value simultaneously. KeyGen may receive a public parameter pp generated based on the security parameter κ in the setup algorithm to generate a pair of a secret key sk and a public key vk. In key generation, a public key vk may be generated from a secret key sk, by using a one-way hash function (e.g., cryptographic hash function, or linear hash function). Alternatively, the public key vk may be generated, using a generator g of a multiplicative group G with a prime order p and a mapping φ (mapping from a set to which the secret key sk belongs to Z (Z is a set of integers)), by computing vk=g^φ(sk) (where ^ is a power operator). Further alternatively, the public key vk may be generated using a keyed-hash function. The secret key sk and the public key vk may also be termed as a first signing key x and a first verification key v, respectively. The key generation apparatus 110 and the verification apparatus 130 may be communicatively connected via a network (e.g., at least one of a wired LAN (Local Area Network), a wireless LAN, a WAN (Wide Area Network), a mobile communication network, a virtual network, etc.). The first verification key v may not be transmitted to the verification apparatus 130, but may be uploaded to a Key-server (a public key database not shown) for registration in association with a Key_ID, etc. In this case, the verification apparatus 130 may be configured to retrieve the first verification key v from the Key-server (public key database), as necessary.

The key generation apparatus 110 applies an encoding function (encoding algorithm) (ENC) to the first signing key x to obtain an encoded key ENC(x). The key generation apparatus 110 composes (e.g., adds or performs bit-wise exclusive OR) the encoded key ENC(x) with the first biometric information w to generate a first parameter s. The first parameter s, in which the first signing key x is encoded and embedded in the first biometric information w, may be also termed as a first Key parameter (first parameter s may correspond to the sketch in reference literature 1 and/or the commitment in the PTL 1, etc.).

$$s := ENC(x) + w \tag{14}$$

The encoding function ENC converts a plaintext m in an information source space to a code c. The decoding function DEC converts the code c into the plaintext m.

$$c \leftarrow ENCm) \tag{15}$$

$$m \leftarrow DEC(c) \tag{16}$$

Here, following equation must hold for a code c' whose difference from c is within a correction range, where c is a code of any plaintext m in the information source space.

$$m = DEC(c') \tag{17}$$

As will be described below, in one of example embodiments, a linear code is used. The linear code has linearity with respect to a code.

Linearity $$ENC(m1)+ENC(m2) \quad (18)$$

is a codeword for m1+m2. Therefore, following equation holds.

$$m1+m2=DEC(ENC(m1)+ENC(m2)) \quad (19)$$

In Equation (19), the "+" on the left and right sides need not be the same operation.

With respect to coding, error-correcting codes (Hamming codes, BCH (Bose-Chaudhuri-Hocquenghem code) codes, RS (Reed-Solomon) codes, LDPC (low-density parity-check code) codes, etc.) may be used. Alternatively, lattice coding may be used. Coding methods using integer lattices, triangular lattices, and more complex lattices are known (see PTL 3, etc.).

The key generation apparatus 110 transmits the first verification key v to the verification apparatus 130 (step 4) and the first parameter s to the signature conversion apparatus 140 (step 5).

The key generation apparatus 110 and the signature conversion apparatus 140 may be communicatively connected via a network (e.g., at least one of a wired LAN (Local Area Network), a wireless LAN, a WAN (Wide Area Network), a mobile communication network, a virtual network, etc.). Applying an encoding function (ENC)/a decoding function (DEC) is referred to as encoding/decoding, respectively. In FIG. 4 and FIG. 5, arrow lines with information to be transmitted, such as the first parameter s, the first verification key v, etc., are schematic examples of transmission of the relevant information (handshakes between a transmission source and a destination are omitted), and as a matter of course do not mean that the communication between the transmission source and the destination is a one-way communication (or unidirectional). The same applies to subsequent drawings.

The signature generation apparatus 120 acquires second biometric information w' in a step performing signing actually (signing phase) (step 1), and also acquires a message M to be signed (step 2). Further, the signature generation apparatus 120 generates a pair of a second signing key x' and a second verification key v' (step 3).

The signature generation apparatus 120 composes (e.g., adds or performs exclusive OR between) a second biometric information w' and an encoded key ENC(x') obtained by applying an encoding function (ENC) to the second signing key x' to obtain a second parameter s'.

$$s'=ENC(x')+w' \quad (20)$$

The signature generation apparatus 120 generates (computes) a second signature σ' (digital signature) for the message M using the second signing key x' (step 5). Here, "digital signature" is used to make it clear explicitly that the signature for the message is generated using the signing key that does not use biometric information, against the above described biometric signature.

$$\sigma' \leftarrow \mathrm{Sign}(x', M) \quad (21)$$

The signature generation apparatus 120 transmits the message M, the second parameter s' (=ENC(x')+w'), the second verification key v', and the second signature σ' to the signature conversion apparatus 140. The signature generation apparatus 120 and the signature conversion apparatus 140 may be communicatively connected via a network (e.g., at least one of a wired LAN (Local Area Network), a wireless LAN, a WAN (Wide Area Network), a mobile communication network, a virtual network, etc.).

The signature conversion apparatus 140 receives the first parameter s (=ENC(x)+w) to store the first parameter s in a storage (step 1). The signature conversion apparatus 140 further receives the message M, the second parameter s'(=ENC(x')+w'), the second verification key v', and the second signature σ' from the signature generation apparatus 120.

The signature conversion apparatus 140 verifies a correctness of the message M and the second signature σ' using the second verification key v' (step 3).

$$0/1 \leftarrow \mathrm{Verify}(v', M, \sigma')$$

The signature conversion apparatus 140 supplies, as an input, a difference between the first parameter s and the second parameter s' to a decoding function (DEC), which computes a key difference (differential key) Δ between the first signing key x and the second signing key x' (step 4).

$$\Delta \leftarrow DEC(s-s') \quad (22)$$

Equation (22) is outlined as follows.

Since $$s-s'=ENC(x)-ENC(x')+w-w' \quad (23)$$

the right-hand side of Equation (22) is given by $$DEC(s-s')=DEC(ENC(x)-ENC(x')+w-w') \quad (24)$$

Since ENC(x)−ENC(x')=ENC(x−x') holds due to a linearity of the encoding function ENC, Equation (24) is rewritten as $$DEC(s-s')=DEC(ENC(x-x')+w-w') \quad (25)$$

When a difference w−w' between the first biometric information w and the second biometric information w' is within a correction range of the decoding function DEC of the linear code, the following equation holds from Equation (25).

$$\Delta=DEC(s-s')=DEC(ENC(x-x'))=x-x' \quad (26)$$

Using the differential key Δ and the second signature σ' with the second signing key x' for the message M, the signature conversion apparatus 140 converts the second signature σ' with the second signing key x' for the message M to the first signature σ with the first signing key x for the message M (step 5).

$$\sigma(=\mathrm{Sign}(x, M)) \leftarrow KHom(\Delta, \sigma') \tag{27}$$

The signature conversion apparatus 140 transmits the message M and the first signature σ to the verification apparatus 130 (step 6).

Key homomorphic operation: σ←Khom (Δ, σ') represents that an algorithm for generating a signature σ with the first signing key x for the message M can be configured from the differential key Δ and the second signature σ' with the second signing key x' (=x−Δ) for the message M. The following outlines a key homomorphic scheme, using a Schnorr signature having a key homomorphic property (see reference literature 2) as an example. In the following, a secret key sk and a public key pk of reference literature 2 are denoted as a signing key sk and a verification key vk, respectively.

Example 1: Schnorr Signature

Setup

In Setup($1^\kappa$), a group G of order p, where p is a prime number with κ bits (κ is a security parameter), is selected, wherein p satisfies $$\kappa = \lceil \log_2 p \rceil \tag{28}$$

where ⌈ ⌉ is a ceiling function for rounding up to an integer value. Then, g is selected uniformly at random from the group G ($g \leftarrow^R G$), hash function $H:G\times\{0, 1\}^* \rightarrow \{0, 1\}^n$ is selected uniformly at random from a hash function family $\{H_k\}_k$, and (G, g, H) is to be a public parameter pp.

$$pp \leftarrow (G, g, H) \tag{29}$$

Key Generation

In KeyGen(pp), a signing key and a verification key are generated using the public parameter pp. x is selected uniformly at random from Zp (set of integers {0, 1, . . . , p−1}(=Z/pZ)).

$$x \leftarrow^R Zp \tag{30}$$

The verification key and the signing key are derived as follows, respectively and are outputted.

$$\text{verification key: } vk \leftarrow g^x, \quad \text{signing key: } sk \leftarrow x \tag{31}$$

Signing

In Sign (sk, M), r is selected uniformly at random from Zp ($r \leftarrow^R Zp$) and a signature σ is computed as follows.

$$c \leftarrow H(g^r, M) \quad y \leftarrow r + x\cdot c \bmod p \quad \sigma \leftarrow (c, y) \tag{32}$$

Verification

Verify (vk,M, σ) returns 1 if $$c = H(((g^x)^{-c} g^y), M) \tag{33}$$

holds, and returns 0 if not.

Key Homomorphic Operation

If the signature σ(=Sign (sk, M)=(c, y)) is a correct signature for message M under a verification key vk, a new signature calculated using σ and Δ:

$$\sigma' \leftarrow (c, y') \quad y' \leftarrow y + \Delta\cdot c \bmod p \tag{34}$$

is found to be a correct signature for the message M under the verification key $$vk' = g^{x+\Delta} \tag{35}$$

That is, the followings hold.

$$\begin{aligned} H\left(vk'^{-c} g^{y'}, M\right) &= H\left(\left\{g^{(x+\Delta)}\right\}^{-c} \cdot g^{(r+(x+\Delta)c)}, M\right) \\ &= H\left(g^{-(x+\Delta)c} \cdot g^r \cdot g^{(x+\Delta)c}, M\right) \\ &= H(g^r, M) = c \end{aligned} \tag{36}$$

It is noted that reference literature 2 discloses the algorithm Adapt, which includes a conversion process that converts a signature σ with a signing key sk to a signature σ' with a signing key sk+Δ. In the example of the present disclosure, an algorithm for converting a second signature σ' with a second signing key x'(=x−Δ) for a message M to a first signature σ with a first signing key x(=(x−Δ)+Δ) for the message M is termed as KHom. KHom does not coincide with Adapt algorithm in reference literature 2, but a shift Δ in Adapt algorithm in reference literature 2 may be associated with a differential key Δ in the example of the present disclosure. Assuming that sk in Adapt of reference literature 2 corresponds to x−Δ, KHom may partially correspond to Adapt of reference literature 2).

The signature generation apparatus 120 transmits first signature σ and the message M to the the verification apparatus 130. The signature generation apparatus 120 may transmit the first signature σ to any apparatus or node not shown. That is, a transmission destination of the first signature σ is not limited to the verification apparatus 130. It may be configured that a pair of a signature and a message is transmitted to an apparatus other than the verification apparatus 130 and stored therein, then an apparatus for verification (which may be the other apparatus) acquires the pair of the signature and the message stored in the other apparatus to verify a signature. In this case, there is a time lag between generation and verification of the signature. Therefore, a plurality of signatures may be verified together. In a block chain network (P2P (peer to peer) network), for example, a procedure is repeated, where the procedure includes transmitting a pair of a signature and a message to the nearest node, temporarily storing the pair of the signature and the message in the nearest node, verifying, by the nearest node, the signature and the message, and propagating, by the nearest node, the signature to an other node if a verification result is acceptance.

The verification apparatus 130 receives the first verification key v from the key generation apparatus 110 to register the first verification key v in a storage. The verification apparatus 130 receives the first signature σ and the message M transmitted from the signature conversion apparatus 140. The verification apparatus 130 verifies a correctness of the message M and the first signature σ using the first verification key v.

$$0/1 \leftarrow \mathrm{Verify}(v,M,\sigma) \quad (37)$$

where, 1 is selected for acceptance and 0 is selected for non-acceptance (reject). The verification apparatus 130 may transmit a verification result to the signature conversion apparatus 140, which is the transmission source of the first signature σ, for example. The signature conversion apparatus 140 and the verification apparatus 130 may be communicatively connected via a network (e.g., at least one of a wired LAN (Local Area Network), a wireless LAN, a WAN (Wide Area Network), a mobile communication network, a virtual network, etc.).

Figure 6:
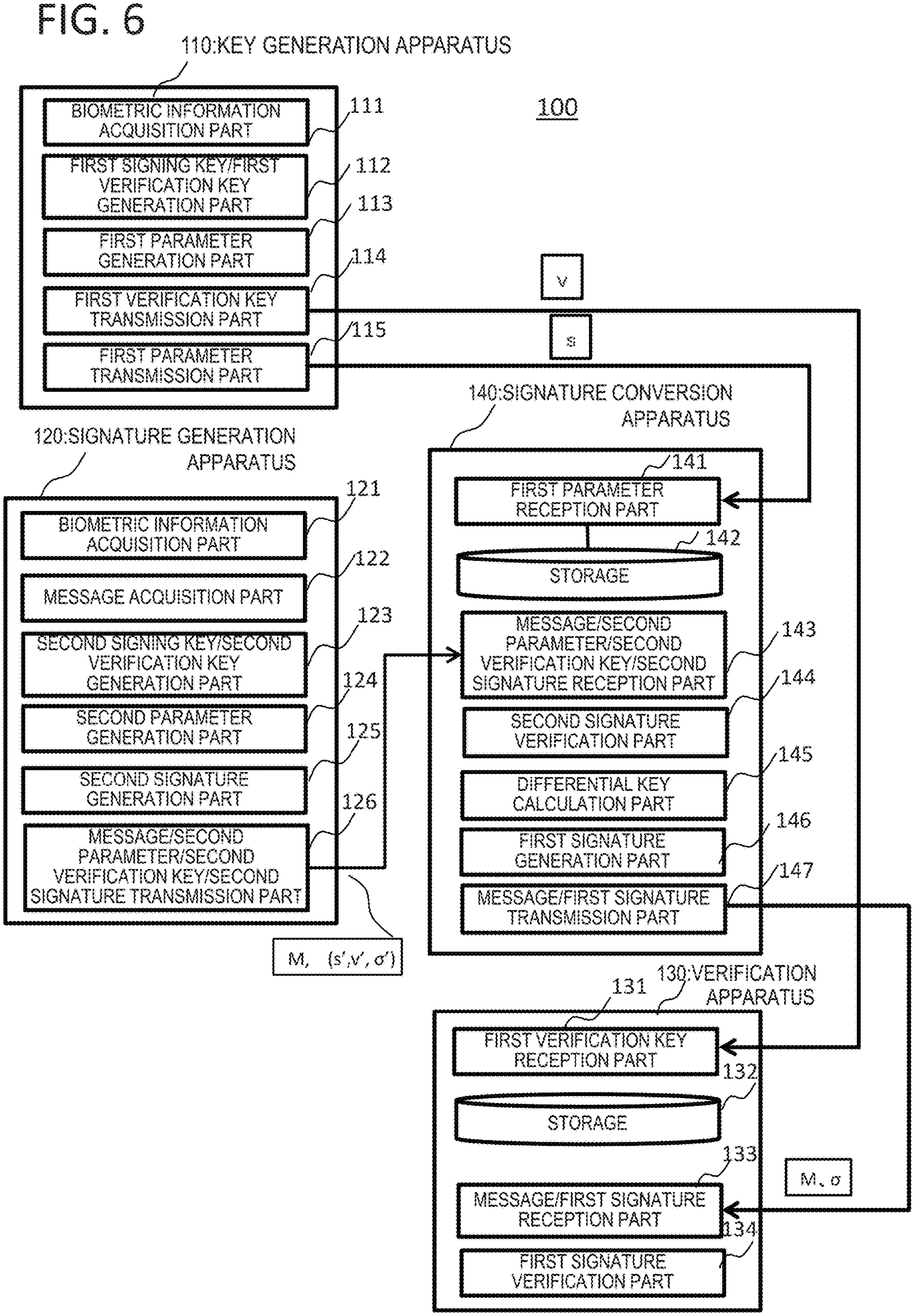
FIG. 6 is a diagram illustrating a configuration in one of example embodiments of the present disclosure.

FIG. 6 is a diagram illustrating an example of a configuration (function blocks) of each apparatus described with reference to FIG. 5. The key generation apparatus 110 includes a biometric information acquisition part 111, a first signing key/first verification key generation part 112, a first parameter generation part 113, a first verification key transmission part 114, and a first parameter transmission part 115. The biometric information acquisition part 111 includes a sensor (not shown) to acquire first biometric information w of a user (or an interface to receive the first biometric information w acquired by an external sensor via a network such as a communication line). The first signing key/first verification key generation part 112 generates a first signing key x and a first verification key v. The first parameter generation part 113 generates a first parameter s using the first signing key x and the first biometric information w. The first verification key transmission part 114 transmits the first verification key v to the verification apparatus 130. The first parameter transmission part 115 transmits the first parameter s to the signature conversion apparatus 140. The first verification key transmission part 114 may transmit the verification key v to a Key-server (public key database) or the like.

The signature generation apparatus 120 includes a biometric information acquisition part 121, a message acquisition part 122, a second signing key/second verification key generation part 123, a second parameter generation part 124, a second signature generation part 125, and a message/second parameter/second verification key/second signature transmission part 126. The biometric information acquisition part 121 includes a sensor (not shown) or the like to acquire second biometric information w' of a user. A modality of the second biometric information w' (such as a face, a vein, a fingerprint, an iris or the like) is the same as that of the first biometric information w. The message acquisition part 122 acquires a message M to be signed. The second signing key/second verification key generation part 123 generates a second signing key x' and a second verification key v'. The second parameter generation part 124 generates a second parameter s' using the second signing key x' and the second biometric information w'. The second signature generation part 125 generates a second signature σ' (digital signature) for the message M using the second signing key x'. The message/second parameter/second verification key/second signature transmission part 126 transmits the message M, the second parameter s', the second verification key v' and the second signature σ' to the signature conversion apparatus 140. Whether the message M and (s', v', σ') are transmitted individually or collectively, an order of transmission, etc., are arbitrary, depending on a n arrangement (protocol) between signature generation apparatus 120 and the signature conversion apparatus 140. The sensor (not shown) in the biometric information acquisition part 121 preferably has the same configuration (the same specifications (such as performance, resolving power or resolution)) as the sensor (not shown) in the biometric information acquisition part 111 in the key generation apparatus 110.

The signature conversion apparatus 140 includes a first parameter reception part 141, a storage 142, a message/second parameter/second verification key/second signature reception part 143, a second signature verification part 144, a differential key calculation part 145, a first signature generation part 146, and a message/first signature transmission part 147. The first parameter reception part 141 receives the first parameter s transmitted from the key generation apparatus 110. The storage 142 stores the first parameter s received at the first parameter reception part 141. The message/second parameter/second verification key/second signature reception part 143 receives the message M, the second parameter s', the second verification key V' and the second signature σ' transmitted from the signature generation apparatus 120. The second signature verification part 144 verifies a correctness of the message M and the second signature σ' using the second verification key v'. The differential key calculation part 145 computes a differential key Δ, which is a difference between the first signing key x and the second signing key x', using the first parameter s and the second parameter s'. The first signature generation part 146 obtains a first signature σ for the message M with the first signing key x using the differential key Δ and the second signature σ'. The message/first signature transmission part 147 transmits the message M and the first signature σ to the verification apparatus 130. Whether the message M and the first signature σ are transmitted individually or collectively, an order of transmission, etc., are arbitrary, depending on the arrangements (protocols) made between the signature conversion apparatus 140 and the verification apparatus 130.

The verification apparatus 130 includes a first verification key reception part 131, a storage 132, a message/first signature reception part 133, and a first signature verification part 134. The first verification key reception part 131 receives the first verification key v generated by the key generation apparatus 110. The storage 132 stores the first verification key v received. The message/first signature reception part 133 receives the message M and the first signature otransmitted from the signature conversion apparatus 140. The first signature verification part 134 verifies a correctness of a pair of the message M and the first signature σ using the first verification key v. The first verification key reception part 131 may send a key acquisition request to a Key-server (public key database) not shown and receive the first verification key v from the Key-server (public key database). The message/first signature reception part 133 may receive the message M and the first signature σ from a node not shown.

Figure 7:
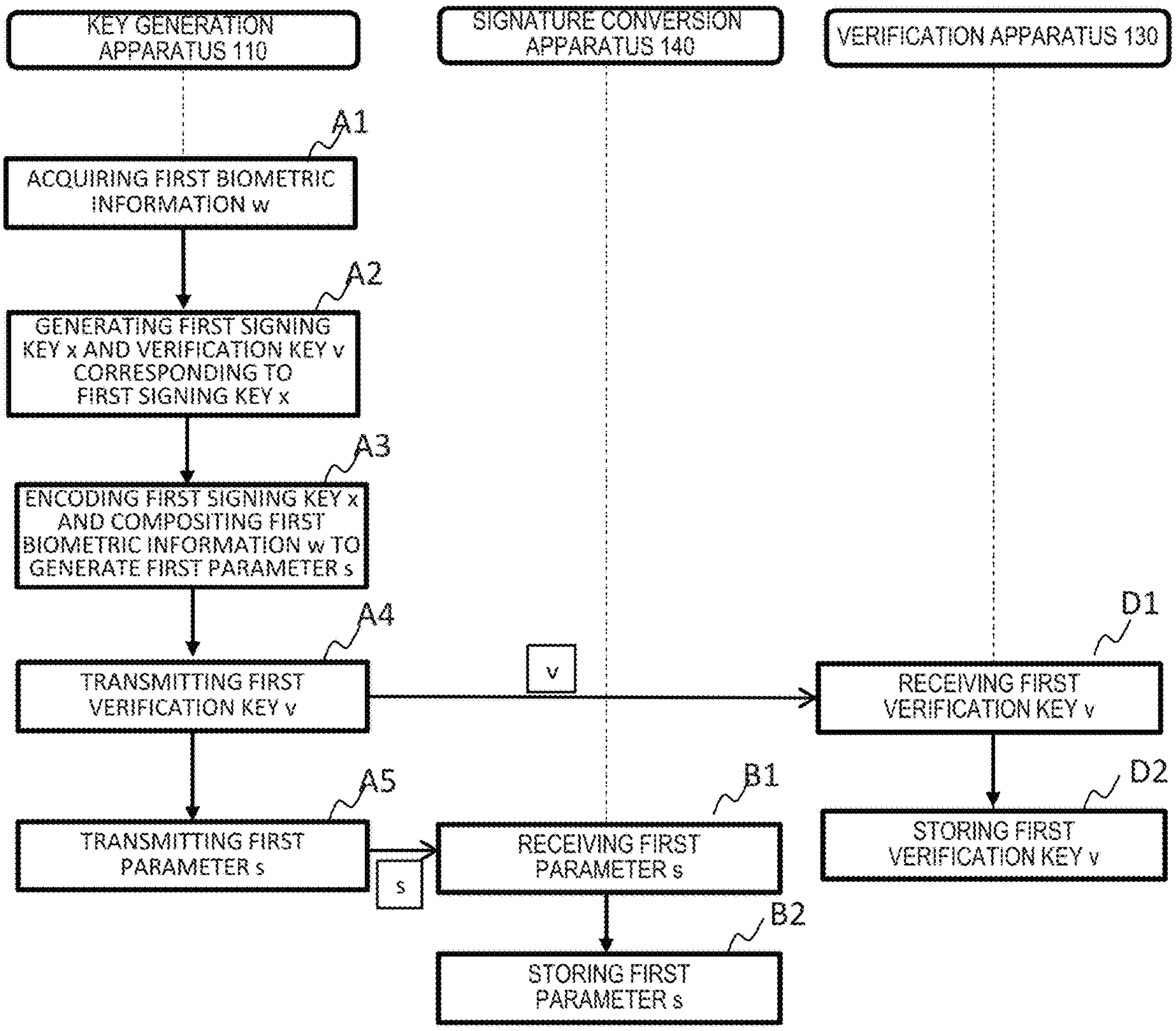
FIG. 7 is a diagram illustrating a process sequence in one of example embodiments of the present disclosure.

FIG. 7 is a diagram illustrating an example of processing operations in a key registration phase in the present example embodiment illustrated in FIG. 6. The biometric information acquisition part 111 of the key generation apparatus 110 acquires the first biometric information w for registration of a user (step A1).

The first signing key/first verification key generation part 112 of the key generation apparatus 110 generates a pair of the first signing key x and the first verification key v corresponding to the first signing key x (step A2).

The first parameter generation part 113 of the key generation apparatus 110 encodes the first signing key x and composes the encoded key ENC(x) with the first biometric information w to generate the first parameter s as follows (step A3).

$$s := ENC(x) + w \tag{38}$$

As a non-limiting example, Equation (38) is described according to an example using a square lattice as an encoding (e.g., PTL 1). The first biometric information w and the second biometric information w' are n-dimensional real number vectors.

$$w = (w_1, \ldots, w_n), \quad w' = (w'_1, \ldots, w'_n) \tag{39}$$

As a distance between the first biometric information w and the second biometric information w', $L^\infty$ distance (also termed as $L^\infty$ norm or maximum norm) is expressed as follows.

$$d^{(n)}{}_\infty(w, w') = \max\{|wi - w'_i|, i = 1, \ldots, n\} \tag{40}$$

If $d^{(n)}{}_\infty$(w,w') is less than or equal to the specified threshold value $t_h$ ($d^{(n)}{}_\infty$(w,w')<=$t_h$), it is considered as a match (w and w' are from an identical person).

Lattice points set L is defined as follows.

$$L = Y = (y_1, \ldots, y_n)\big|y_{i,}, \text{ is a non-negative integer, } 0 <= y_i <= K\big\} \tag{41}$$

where K is a predetermined integer that is sufficiently larger than $t_h$ and $|w_i|$.

The function int( ) that maps an n-dimensional vector Y∈L to an integer z is defined as follows.

$$z \leftarrow \text{int}(Y) = \sum_{i=1}^{n} y_i(2K)^{i-1} \tag{42}$$

An inverse function $\text{int}^{-1}$( ) is a function that maps integer z to n-dimensional vector Y.

$$Y \leftarrow \text{int}^{-1}(z) \tag{43}$$

On reception of the first signing key x (integer) as an input, the inverse function $\text{int}^{-1}$ returns (outputs) an n-dimensional vector A.

$$A = (a_1, \ldots, a_n) \leftarrow \text{int}^{-1}(x) \tag{44}$$

If an encoding function ENC( ) is set to $2t_h*\text{int}^{-1}$( ), an encoded key c of the first signing key x becomes an n-dimensional vector as given below.

$$c = (c_1, \ldots, c_n) \leftarrow ENC(x) = 2t_h * \text{int}^{-1}(x) = 2t_h * (a_1, \ldots, a_n) \tag{45}$$

Thus, the first parameter s is given by follows.

$$s := ENC(x) + w = 2t_h * (a_1, \ldots, a_n) + (w_1, \ldots, w_n) = (2t_h * a_1 + w_1, \ldots, 2t_h * a_n + w_n) \tag{46}$$

The first verification key transmission part 114 in the key generation apparatus 110 transmits the first verification key v generated to the verification apparatus 130 (step A4). The key generation apparatus 110 may upload the first verification key v to a Key-server (public key database) not shown to make it public on the Internet or the like.

The first parameter transmission part 115 in the key generation apparatus 110 transmits the first parameter s to the signature conversion apparatus 140 (step A5). The order of steps A4 and A5 may be interchanged.

The first verification key reception part 131 in the verification apparatus 130 receives the first verification key v (step D1) and stores the first verification key vin the storage 132 (step D2). The first verification key reception part 131 in the verification apparatus 130 may acquire and store the first verification key v from a Key-server not shown that has registered the verification key.

The first parameter reception part 141 in the signature conversion apparatus 140 receives the first parameter s which is transmitted from the key generation apparatus 110 (step B1) to store the first parameters in the storage 142 (step B2).

Figure 8:
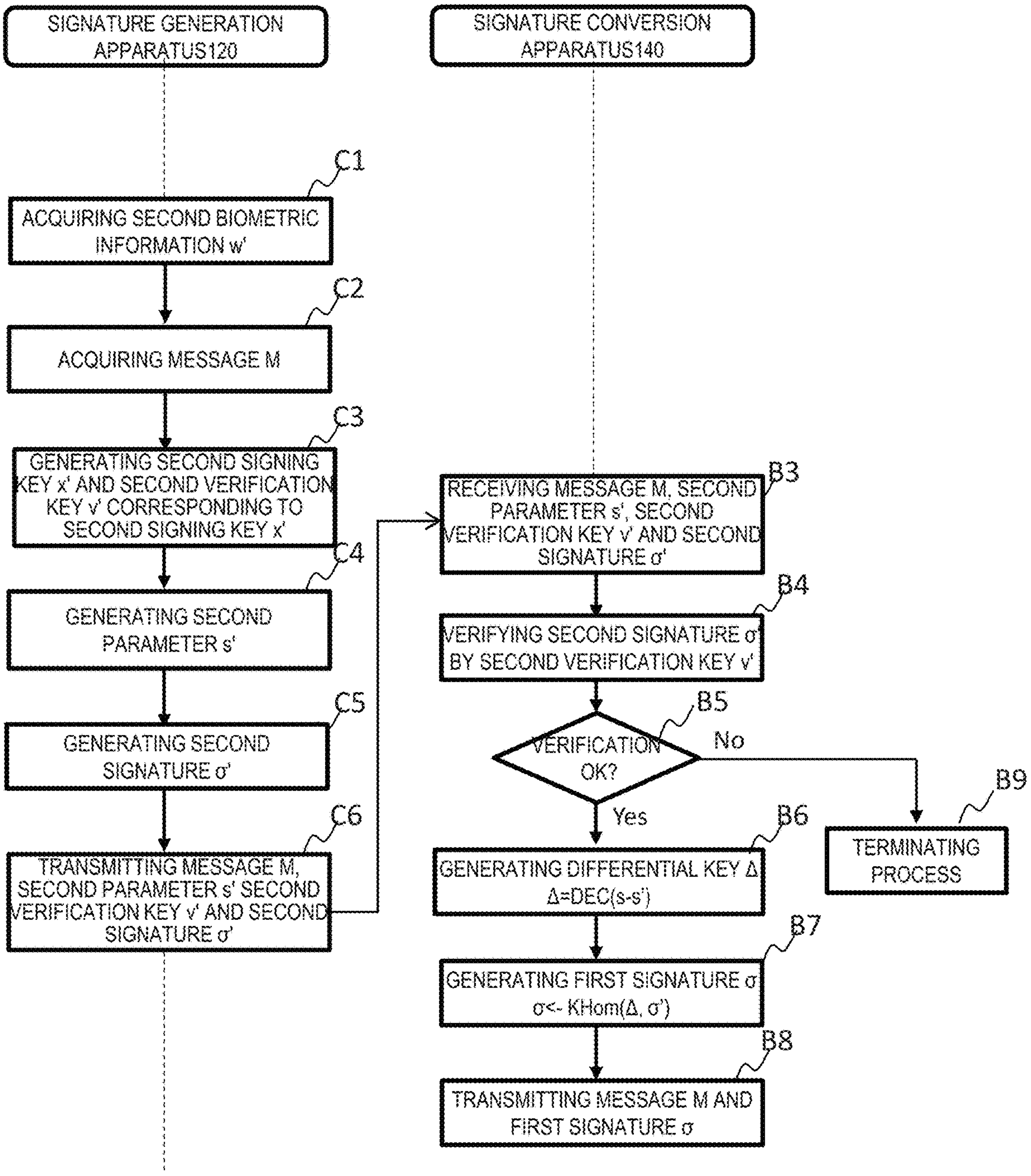
FIG. 8 is a diagram illustrating a process sequence in one of example embodiments of the present disclosure.

FIG. 8 is a diagram illustrating an example of a processing operation of signature generation phase in the example of the present disclosure illustrated in FIG. 6.

The biometric information acquisition part 121 in the signature generation apparatus 120 acquires second biometric information w' for user signing (step C1).

The message acquisition part 122 in the signature generation apparatus 120 acquires a message M (step C2).

The second signing key/second verification key generation part 123 in the signature generation apparatus 120 generates a second signing key x' and a second verification key v' (step C3).

The second parameter generation part 124 in the signature generation apparatus 120 composites a value ENC(x') encoding the second signing key x' and the second biometric information w' to generate a second parameter s' (step C4).

$$s' := ENC(x') + w' \quad (47)$$

As a non-limiting example, if a square lattice is used as an encoding, as with the first parameter s, an encoded key c' of the second signing key x' becomes an n-dimensional vector as given below.

$$c' = (c'_1, \ldots, c'_n) \leftarrow ENC(x') = 2t_h * \mathrm{int}^{-1}(x')) = 2t_h * (a'_1, \ldots, a'_n) \quad (48)$$

The second parameter s' is a n-dimensional real-valued vector given as follows.

$$s' := 2t_h * \mathrm{int}^{-1}(x')) + w' = 2t_h * (a'_1, \ldots, a'_n) + (w'_1, \ldots, w'_n) = (2t_h * a'_1 + w'_1, \ldots, 2t_h * a'_n + w'_n) \quad (49)$$

The second signature generation part 125 in the signature generation apparatus 120 generates a second signature σ' for the message M using the second signing key x' (step C5).

The message/second parameter/second verification key/second signature transmission part 126 in the signature generation apparatus 120 transmits the message M, the second parameter s', the second verification key v' and the second signature σ' to the signature conversion apparatus 140 (step C6).

The message/second parameter/second verification key/second signature reception part 143 in the signature conversion apparatus 140 receives the message M, the second parameter s', the second verification key v', and the second signature σ' transmitted from the signature generation apparatus 120 (step B3).

The second signature verification part 144 in the signature conversion apparatus 140 verifies a correctness of the second signature σ' and the message M using the second verification key v' (step B4). The signature conversion apparatus 140 terminates a process if a verification result is non-acceptance (step B9). When the verification result is successful (acceptance), the differential key calculation part 145 in the signature conversion apparatus 140 supplies a difference s–s' between the first parameter s and the second parameter s', as input to a decoding function DEC to obtain a difference Δ=x–x' between the first signing key x and the second signing key x' (Step B6).

$$\Delta \leftarrow DEC(s - s') \quad (50)$$

As a non-limiting example, in a case where a square lattice is used for encoding and $2t_h * \mathrm{int}^{-1}(\ )$ is used as the encoding function ENC, the decoding function DEC may be defined as follows.

$$DEC(c) = \mathrm{int}(c/2t_h) \quad (51)$$

In this case, since x and x' are integer values, $\mathrm{int}^{-1}(x) - \mathrm{int}^{-1}(x') = \mathrm{int}^{-1}(x - x')$ holds and DEC (s–s') is given by $$\mathrm{int}\left[\frac{1}{2t_h}\{(w + 2t_h * \mathrm{int}^{-1}(x)) - (w' * 2t_h * \mathrm{int}^{-1}(x'))\}\right] = \mathrm{int}\left\{\mathrm{int}^{-1}(x - x') + \frac{1}{2t_h}(w - w')\right\} \quad (52)$$

For the first biometric information w and the second biometric information w', when $$d^{(n)}{}_{\infty}(w, w') = \max\{|wi - w'_i|, i = 1, \ldots, n\} \leqq t_h \quad (53)$$

holds, each component of the n-dimensional vector $(w-w')/2t_h$ in Equation (52) is all less than or equal to ±½, and thus Equation (52) is expressed as $$\mathrm{int}(\mathrm{int}^{-1}(x - x')) = x - x'$$

Accordingly, Δ as an output of DEC(s–s') in Equation (50) is given as follows.

$$\Delta = \mathrm{int}(\mathrm{int}^{-1}(x - x')) = x - x' \quad (54)$$

From above, it can be confirmed that the difference x–x' between the first signing key x and the second signing key x' is correctly reconstructed by the decoding function DEC. The first parameter s is a parameter obtained by composing an encoded key ENC(x) of the first signing key x and the first biometric information w by vector addition, and the second parameter s' is a parameter obtained by composing an encoded key ENC(x') of the second signing key x' and the second biometric information w' by vector addition. Therefore, the signature conversion apparatus 140 is able to compute the differential key Δ, which is the difference x–x' between the first signing key x and the second signing key x', by decoding a result of subtracting the second parameter s' from the first parameter s.

The first signature generation part 146 in the signature conversion apparatus 140 generates a first signature σ with the first signing key x for the message M from the second signature σ' with the second signing key x' for the message M by a Key homomorphic operation using the second signature σ' and the differential key Δ (step B7).

$$\sigma \leftarrow KHom(\Delta, \sigma') \quad (55)$$

Figure 9:
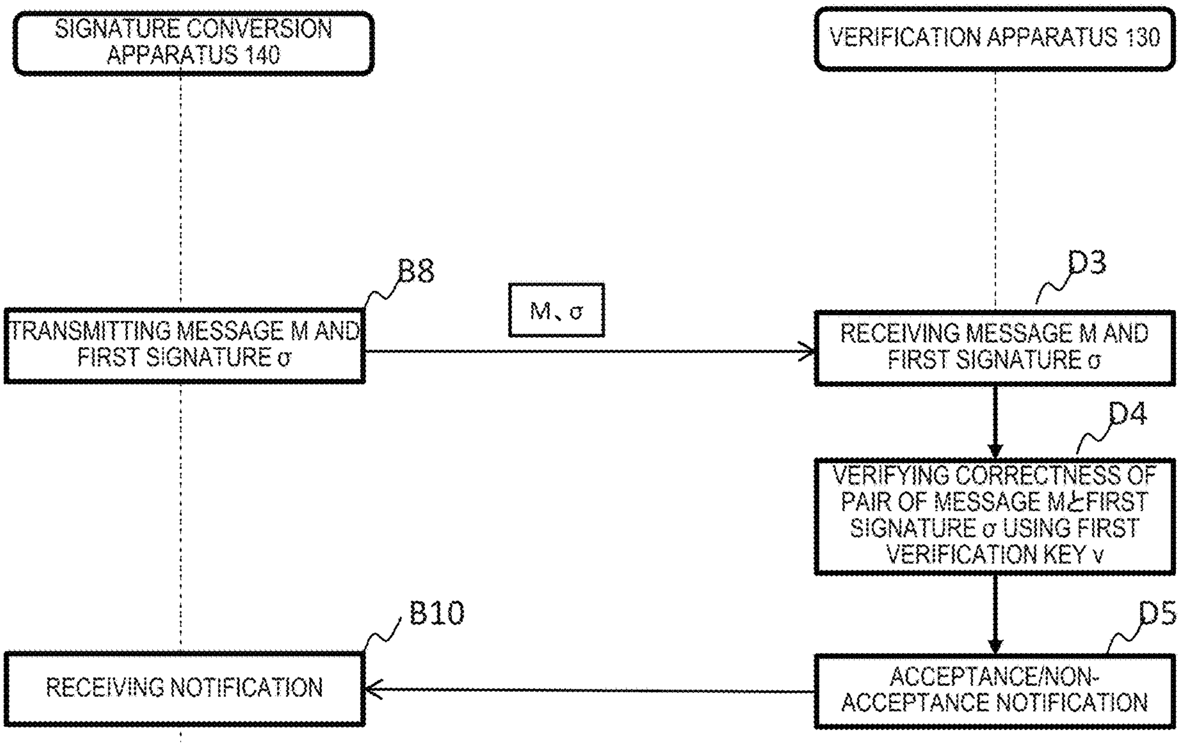
FIG. 9 is a diagram illustrating a process sequence in one of example embodiments of the present disclosure.

FIG. 9 is a diagram illustrating an example of a processing operation of signature verification phase in the example of the present disclosure illustrated in FIG. 6.

The message/first signature transmission part 147 in the signature conversion apparatus 140 transmits the message M and the first signature σ to the verification apparatus 130. (step B8).

The message/first signature reception part 133 in the verification apparatus 130 receives the message M and the first signature σ transmitted from the signature conversion apparatus 140 (step D3).

The first signature verification part 134 in the verification apparatus 130 verifies a correctness of a pair of the message M and the first signature σ using the first verification key v (step D4).

The verification apparatus 130 may transmit a verification result (acceptance/non-acceptance notification) to the signature conversion apparatus 140, which is a transmission source of the first signature σ (step D5). In this case, the signature conversion apparatus 140 receives an acceptance/non-acceptance notification (step B10). The verification apparatus 130 may transmit the verification result (notification of acceptance or rejection) to the signature generation apparatus 120.

The verification process may be executed at an arbitrary timing. For example, by verifying a signature that is stored with a message M when the message Mis to be used, it is possible to verify that the message M has not been altered, inclusive of a time period during when the message M and the signature have been retained. A pair of the message M and the signature may be verified a number of times.

Figure 10:
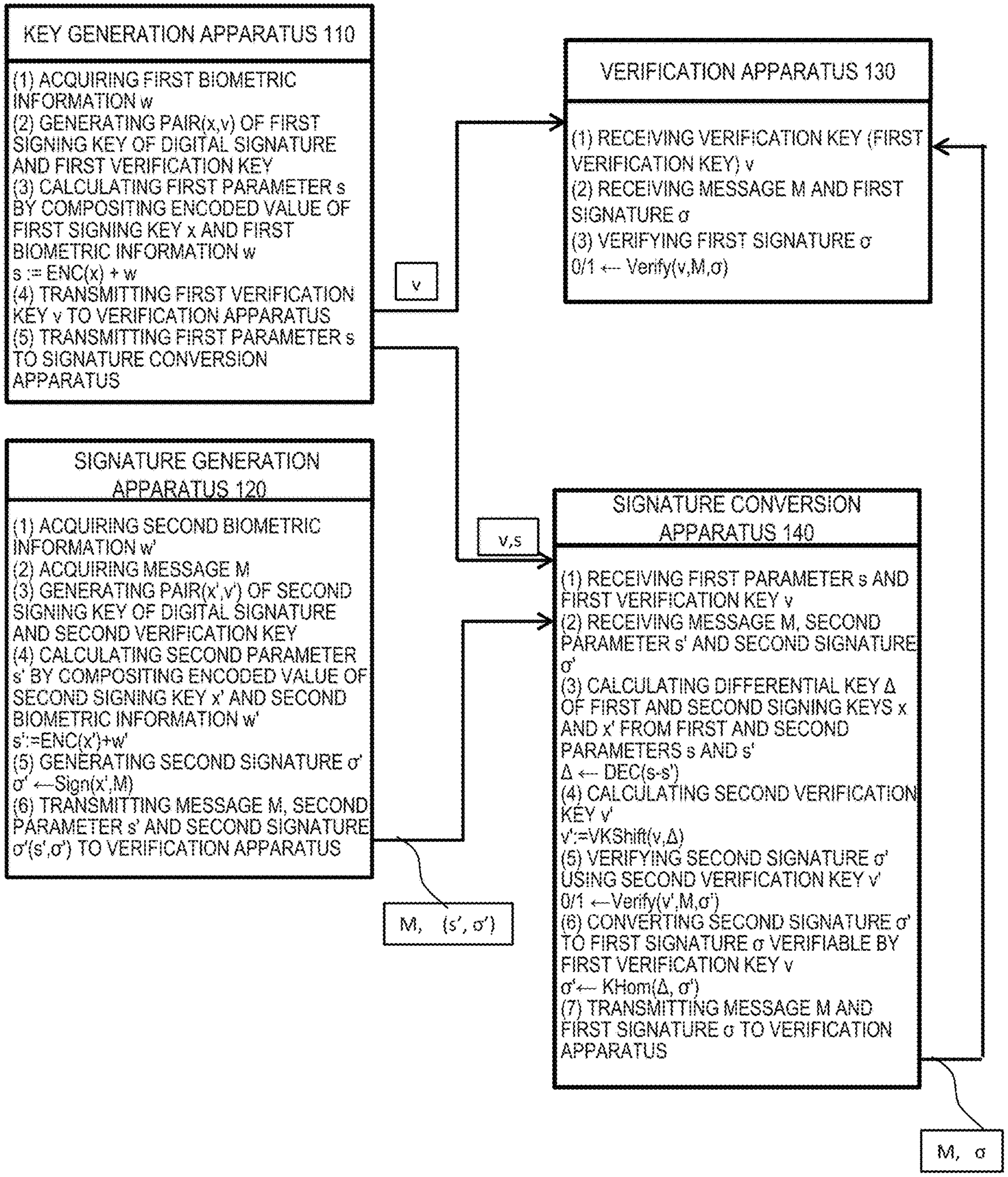
FIG. 10 is a diagram illustrating another operation process in one of example embodiments of the present disclosure.

FIG. 10 is a diagram illustrating another one of example embodiments. A system configuration of the another one of example embodiments is basically the same as that illustrated in FIG. 5. The signature generation apparatus 120 differs from that of the system illustrated in FIG. 5, in that the signature transmitted to the signature conversion apparatus 140 together with the message M and including the second parameter s, does not include the second verification key v' and the message M, the second parameter s' and the second signature σ' are transmitted to the signature conversion apparatus 140. In FIG. 10, the signature generation apparatus 120 transmits the message M, the second parameter s' and the second signature σ' to the signature conversion apparatus 140 in step 6. In addition, in distinction from the system illustrated in FIG. 5, the signature conversion apparatus 140 performs process of step 4 to compute the second verification key v' from the first verification key v and the differential key Δ. For this reason, the order of processing in the signature conversion apparatus 140 in FIG. 10 differs from that in FIG. 5.

Referring to FIG. 10, the signature conversion apparatus 140 receives the first parameter s and the first verification key v from the key generation apparatus 110 (step 1). The signature conversion apparatus 140 may acquire the first verification key v from a Key-server. Alternatively, the key generation apparatus 110 may include the first verification key v in a public parameter known to the signature conversion apparatus 140.

The signature conversion apparatus 140 receives the message M, the second parameter s' and the second signature σ' from the signature generation apparatus 120 (step 2). The signature conversion apparatus 140 computes a differential key Δ between the first signing key x and the second signing key x' using the first parameter s and the second parameter s' (step 3). This process corresponds to process (step 4) of the signature conversion apparatus 140 in FIG. 5.

$$\Delta \leftarrow DEC(s - s') \tag{56}$$

The signature conversion apparatus 140 computes a second verification key v' using the first verification key v and the differential key Δ (step 4).

$$v' := VKShift(v, \Delta) \tag{57}$$

where VKShift is a function that receives the first verification key v and the differential key Δ, as input, and returns the second verification key v'.

As an example, in the case of the Schnorr signature, for a signing key x, a verification key v is given as g^x (i.e., v=g^x, where g is a generator in a group of a prime order and ^ is a power operator). With the first verification key and the first signing key being v and x, respectively, because of x−x'=Δ, the second signing key x' is expressed as x'=x−Δ. Thus, the second verification key v' corresponding to the second signing key x' is obtained from the first verification key v and the differential key Δ as follows.

$$v' = g\hat{\ }x' = g\hat{\ }(x - \Delta) = (g\hat{\ }x) \cdot (g\hat{\ }(-\Delta)) = v / (g\hat{\ }\Delta) \tag{58}$$

The signature conversion apparatus 140 verifies the second signature σ' for the message M using the second verification key v' (step 5). This process corresponds to the process (step 3) of the signature conversion apparatus 140 described with reference to FIG. 5.

$$0/1 \leftarrow \text{Verify}(v', M, \sigma') \tag{59}$$

The signature conversion apparatus 140 converts the second signature σ' with the second signing key x' for the message M to the first signature (digital signature) σ with the first signing key x for the message M (step 6). This process corresponds to the process (step 5) of the signature conversion apparatus 140 described with reference to FIG. 5.

$$\sigma \leftarrow KHom(\Delta, \sigma') \tag{60}$$

The signature conversion apparatus 140 transmits the message M and the first signature (digital signature) σ to the verification apparatus 130 (step 7). This process corresponds to the process (step 6) of the signature conversion apparatus 140 described with reference to FIG. 5.

Figure 11:
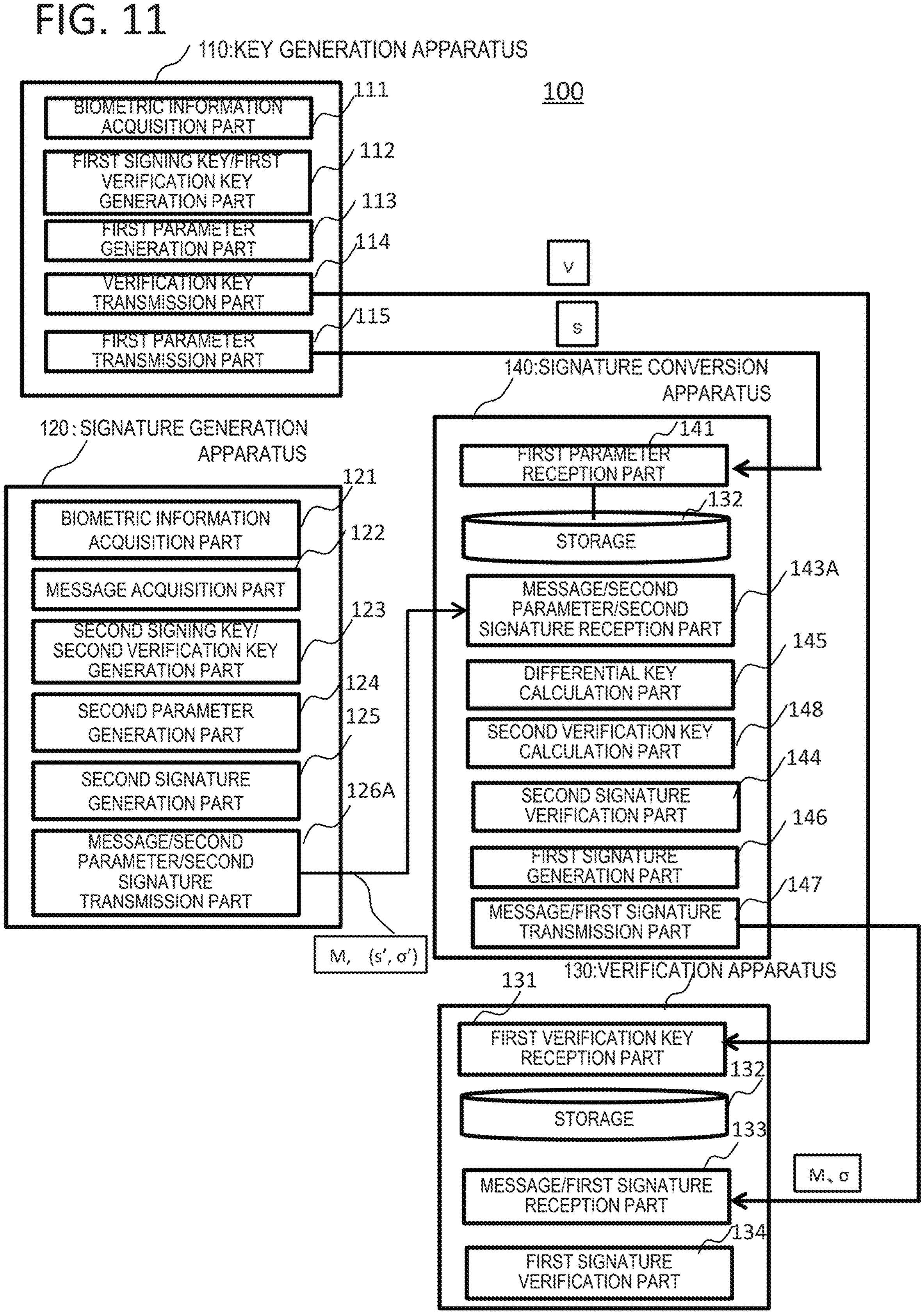
FIG. 11 is a diagram illustrating another configuration in one of example embodiments of the present disclosure.

FIG. 11 is a diagram illustrating an example of a configuration of each apparatus according to FIG. 10. The same elements as in FIG. 6 are marked with the same reference signs and description thereof is omitted. Referring to FIG. 11, the signature conversion apparatus 140 includes a second verification key calculation part 148 in addition to the configuration of that in FIG. 6.

A message/second parameter/second signature transmission part 126A in the signature generation apparatus 120 transmits the message M, the second parameter s' and the second signature σ' to the signature conversion apparatus 140.

A message/second parameter/second signature part 143A in the signature conversion reception apparatus 140 receives the message M, the second parameter s' and the second signature σ' transmitted from the signature conversion apparatus 140.

The second verification key calculation part 148 performs the process (step 4) of the signature conversion apparatus 140 described with reference to FIG. 10 to compute a second verification key v'.

Figure 12:
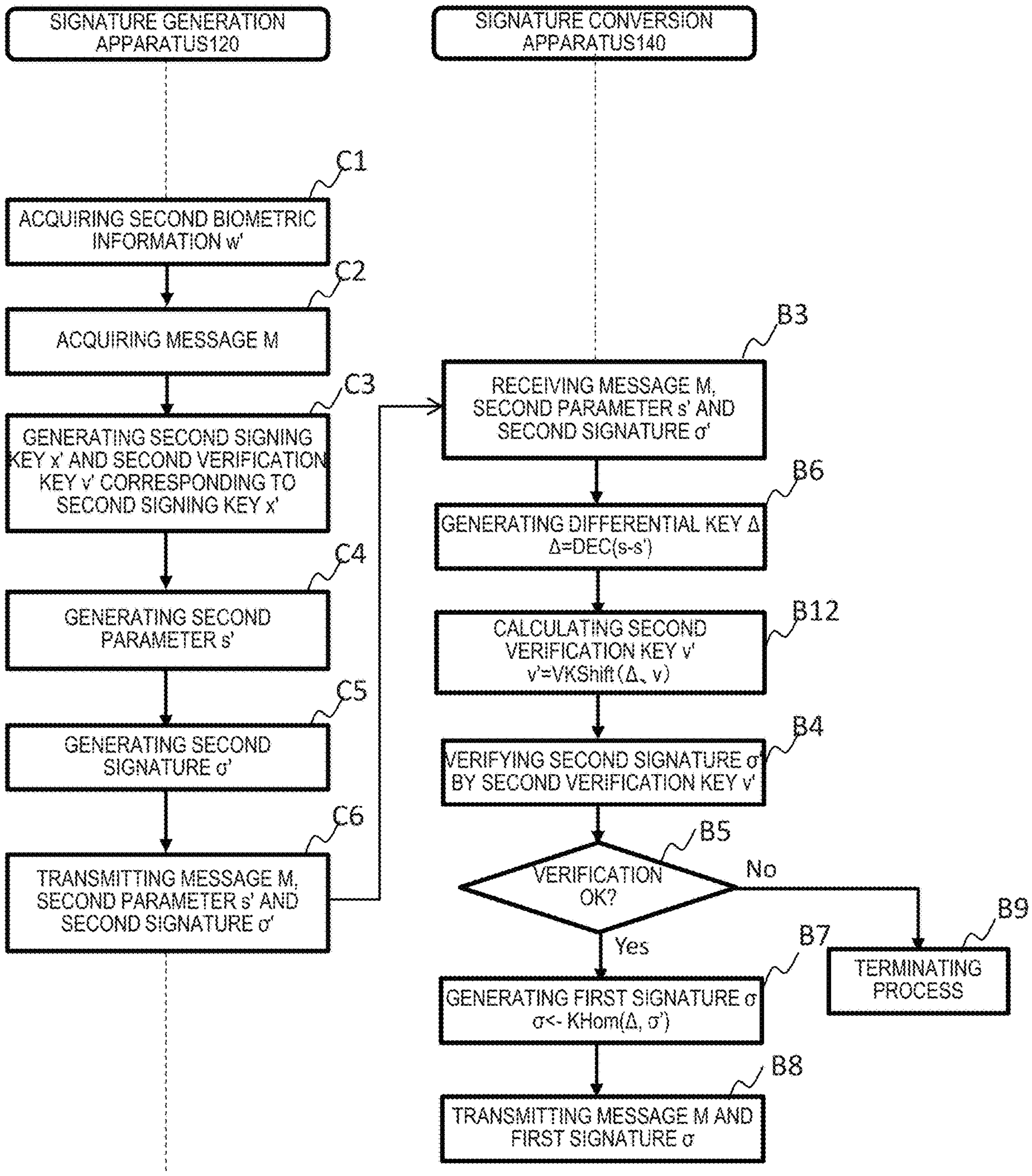
FIG. 12 is a diagram illustrating another process sequence in one of example embodiments of the present disclosure.

FIG. 12 illustrates an example of a processing operation in the signature generation phase in the other example embodiment according to FIG. 10 and FIG. 11. A key generation phase and a verification phase thereof is the same as in the examples illustrated in FIG. 7 and FIG. 9. In FIG. 12, message/second parameter/second signature transmission part 126A in the signature generation apparatus 120 transmits the message M, the second parameter s' and the second signature σ' to the signature conversion apparatus 140 (step C6).

The message/second parameter/second signature reception part 143A in the signature conversion apparatus 140 receives the message M, the second parameter s' and the second signature σ' transmitted from the signature generation apparatus 120 (step B3).

The differential key calculation part 145 in the signature conversion apparatus 140 supplies a difference s−s' between the first parameter s and the second parameter s' to a decoding function DEC, as input to obtain a difference Δ=x−x' between the first signing key x and the second signing key x' (step B6).

$$\Delta \leftarrow DEC(s - s') \tag{61}$$

The second verification key calculation part 148 in the signature conversion apparatus 140 computes the second verification key v' using the first verification key v and the differential key Δ (step B12).

$$v' = VKShift(v, \Delta) \tag{62}$$

The second signature verification part 144 in the signature conversion apparatus 140 verifies a correctness of a pair of the message M and the second signature σ' using the second verification key v' (step B4). The signature conversion apparatus 140 terminates a process if a verification result is non-acceptance (step B9). If the verification result is acceptance, the first signature generation part 146 in the signature conversion apparatus 140 generates the first signature σwith the first signing key x (=x'+Δ) for the message M from the second signature σ' with the second signing key x' for the message M by a Key homomorphic operation using the second signature σ' and the differential key Δ (step B7).

$$\sigma \leftarrow KHom(\Delta, \sigma') \tag{63}$$

The signature conversion apparatus 140 transmits the message M and the first signature σ to the verification apparatus 130 (step B8).

The key homomorphic operation algorithm, which converts the second signature σ' with the second signing key x' for message M to the first signature σ with the first signing key x(=x'+Δ) for message M, may include Δ and σ'(σ←KHom(Δ, σ')) corresponding to the signature algorithm, as well as including Δ, σ' and message M, as in Equation (64) (reference literature 2; 4.7 Randomizable SPS by Abe et al.), or, including a differential key Δ, a second signature σ', and a message M with a first verification key v, as in Equation (65) (reference literature 2; 4.8 Ghadafi's Short SPS).

$$\sigma \leftarrow KHom(\Delta, \sigma', M) \tag{64}$$

$$\sigma \leftarrow KHom(\Delta, \sigma', M, v) \tag{65}$$

Figure 13:
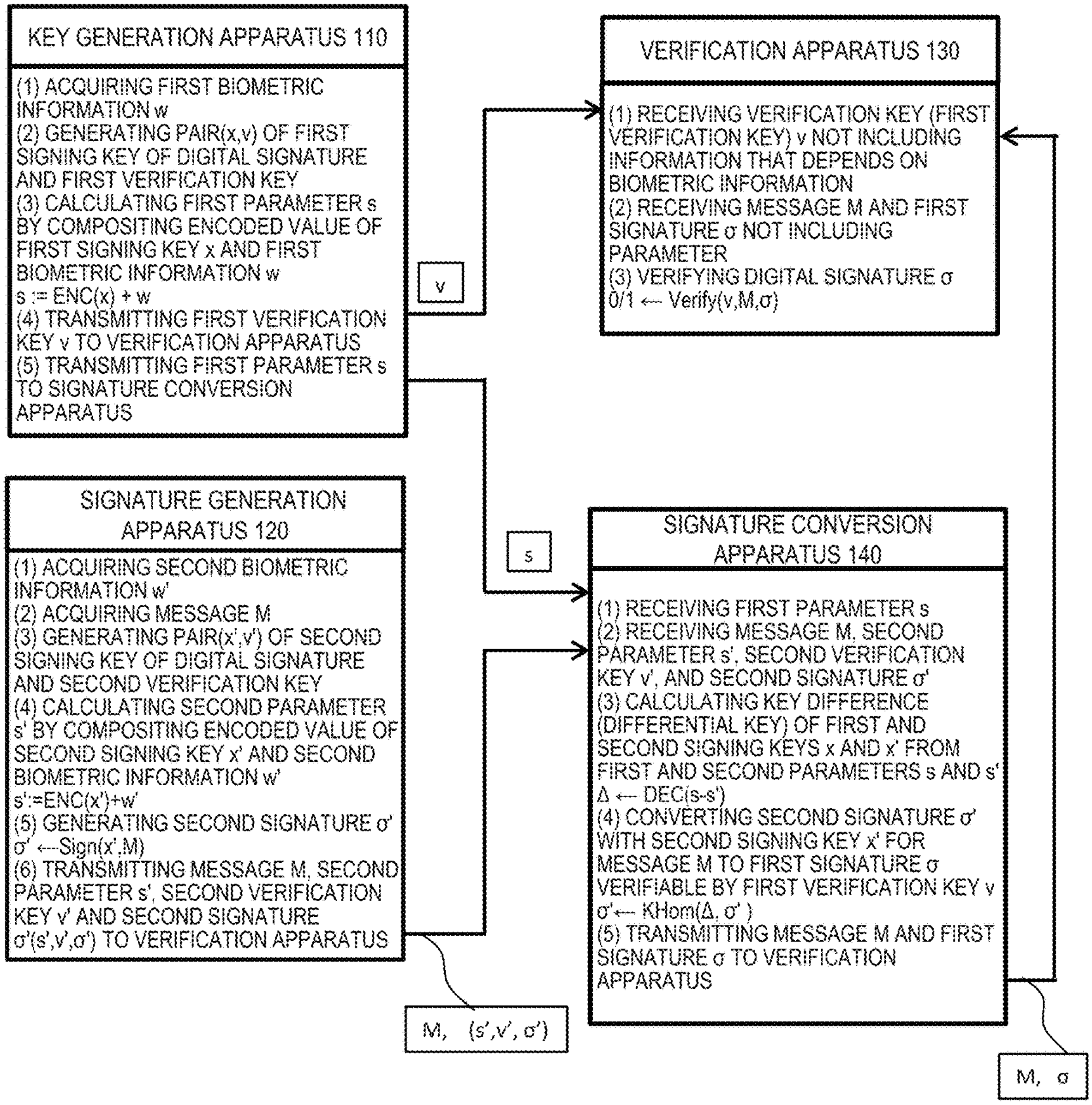
FIG. 13 is a diagram illustrating a variation example of the operation process (FIG. 5) in one of example embodiments of the present disclosure.

FIG. 13 illustrates a variation example of the operation process of the example embodiment described with reference to FIG. 5 and others. In this variation example, the signature conversion apparatus 140 does not verify the second signature σ' by the second verification key v'. The operation process and configuration of the key generation apparatus 110, the signature generation apparatus 120, and the verification apparatus 130 are the same as those in FIG. 5 and FIG. 6.

In the examples of the present disclosure described with reference to FIG. 5, FIG. 6 and FIG. 8, the signature conversion apparatus 140 receives the signature (s', v', σ') including the second parameter s' and the message M transmitted from the signature generation apparatus 120 and verifies the second signature σ' for the message M using the second signing key x'. If a result of this verification is successful (acceptance), the signature conversion apparatus 140 generates a differential key Δ and generates the first signature σ for the message M, using the differential key Δ and the second signature σ', where the first signature σ is able to be verified using the first verification key v. That is, at the signature conversion apparatus 140, which is an intermediate node between the signature generation apparatus 120 and the verification apparatus 130, the second signature σ' is verified to verify that the message M has not been altered, and so on. If a verification result is rejection (non-acceptance), the first signature σ' is neither generated nor transmitted to the verification apparatus 130. Thus, by verifying the second signature σ' using the second signing key x' prior to verification in the verification apparatus 130, security is strengthened and, if a verification result is non-acceptance (rejection), unnecessary operations and transmissions, thereby contributing to reduction of processing and network load, for example. However, the verification apparatus 130 finally verifies a correctness of a pair of the message M and the first signature σ using the first verification key v. Therefore, it can be said that it is not necessarily necessary for the signature conversion apparatus 140 to verify a correctness of a pair of the message M and the second signature σ' using the second signing key x'. This can be used as a variation example.

Referring to FIG. 13, in this variation example, the process of verifying the correctness of the pair of the message M and the second signature σ' using the second verification key v' in the signature conversion apparatus 140 (the process (step 3) of the signature conversion apparatus 140 described with reference to FIG. 5) is deleted, and the processes (steps 4-6) of the signature conversion apparatus 140 described with reference to FIG. 5 are moved up to steps 3-5. In this variation example, the second signature verification part 144 in FIG. 6 is deleted as the configuration of the signature conversion apparatus 140 (the rest remains as in FIG. 6). In addition, steps B4, B5, and B9 in FIG. 8 are deleted as processing steps of the signature conversion apparatus 140 (all other steps remain as in FIG. 8).

Figure 14:
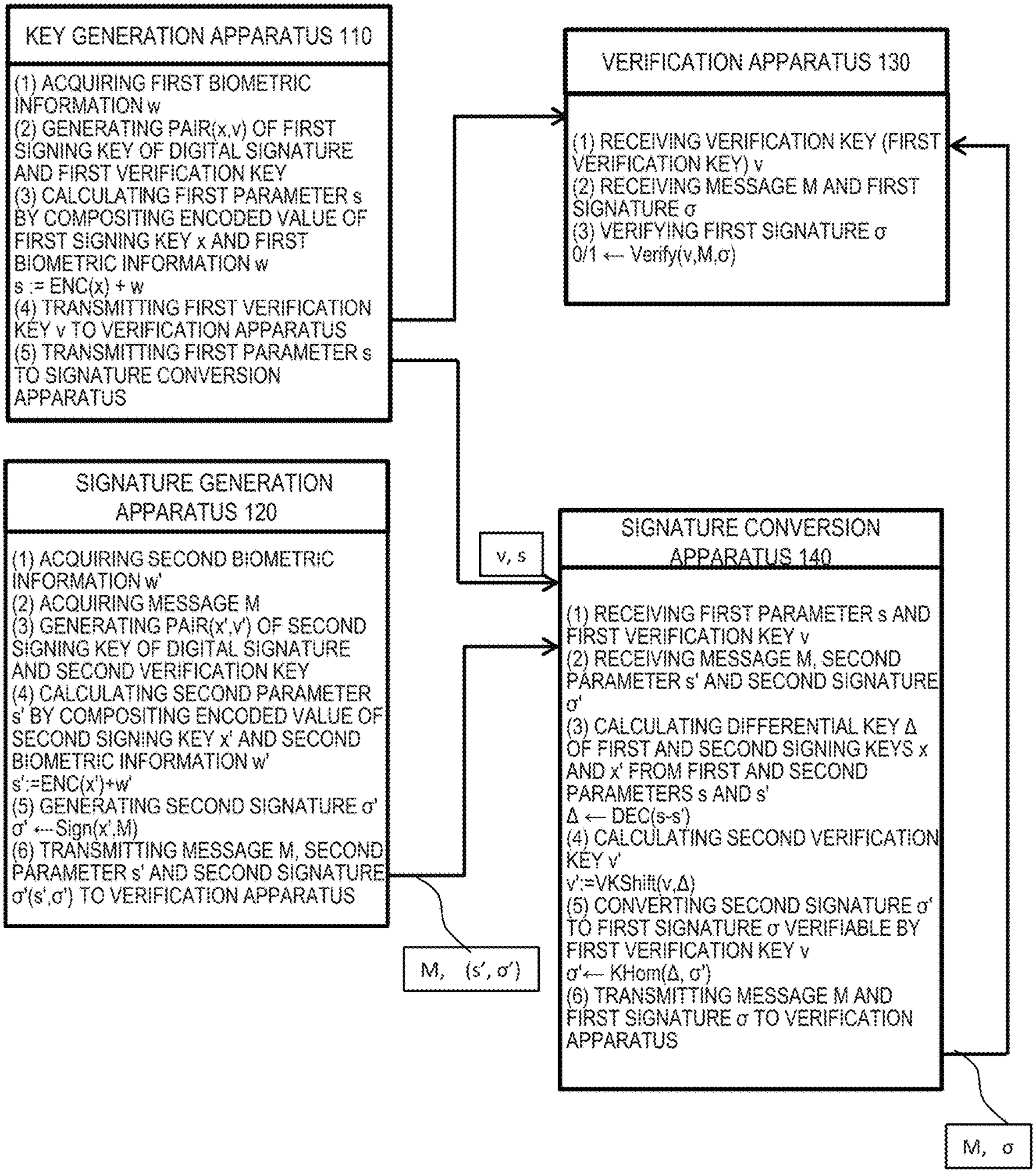
FIG. 14 is a diagram illustrating a variation example of the operation process (FIG. 10) in one of example embodiments of the present disclosure.

FIG. 14 is a diagram illustrating a variation example another of operational process of the example embodiment described with reference to FIG. 10, etc. In this variation example, as that in FIG. 13, a verification of the second signature σ' by the second verification key v' is not required in the signature conversion apparatus 140. Referring to FIG. 14, in this variation example, the process of verifying the correctness of the pair of the message M and the second signature σ' using the second verification key v' in the signature conversion apparatus 140 (the process (step 5) of the signature conversion apparatus 140 in FIG. 10) is deleted, and the process (step 6) of the signature conversion apparatus 140 in FIG. 10 and subsequent processes are moved up. In this variation example, the second signature verification part 144 in FIG. 11 is deleted as the configuration of the signature conversion apparatus 140 (the rest remains as in FIG. 11). In addition, steps B4, B5, and B9 in FIG. 12 are deleted as processing steps of the signature conversion apparatus 140 (all other steps remain as in FIG. 12).

The following describes, as another non-limiting example, an example where biometric information is binary coded to binary data.

Number of bits in codeword: n

Number of error bits allowed: D

The first parameter generation part 113 in the key generation apparatus 110 encodes the first signing key x and generates a first parameter s. The first parameter s is generated by computing bitwise exclusive OR (xor) of the encoded first signing key ENC (x) and the first biometric w (n-bit binary data).

$$s := ENC(x)x \text{ or } w \tag{66}$$

In the first parameter generation part 113, the first signing key x (L bits) is supplied as input to the error correction encoding function (ENC) to obtain an encoded key c (n bits).

$$c = [c_1, \ldots, c_n] \leftarrow ENC(x) \tag{67}$$

where $c_i$ (i=1, . . . n) is a value of the i-th bit of c.

The encoded key c according to an error correction coding may have a length of n bits which is a sum of a length of information bits and a length of code bits. For example, in Hamming code, a code length is $n=2^k-1$, and the length of information bits is L=n−k. The first parameter generation part 113 computes bitwise exclusive OR of the first biometric information w (n bits) and the encoded key c to obtain the first parameter s (n bits) for output.

$$s := w \, xor \, c = [w_1 \, xor \, c_1, \ldots, w_n \, xor \, c_n] \tag{68}$$

The second parameter generation part 124 in the signature generation apparatus 120 may generate the second parameter s' from a result of computing bitwise exclusive OR of the encoded value ENC(x') of the second signing key x' and the second biometric information w'.

$$s' := ENC(v') \, xor \, w' \tag{69}$$

In the second parameter generation part 124, the second signing key x' (L bits) is supplied as input to the error correction encoding function (ENC) to obtain an encoded key c of n bits. As described above, in Hamming code, a length of a codeword (information bits+code bits) is $n=2^k-1$ (k is 3 or more integers) and a length of information bits is L.

$$c' = [c'_1, \ldots, c'_n] \leftarrow ENC(x') \tag{70}$$

where $c'_i$ (i=1, . . . n) is a value of the i-th bit of c'.

Next, the second parameter generation part 124 computes bitwise exclusive OR of the second biometric information w' (n bits) and the encoded key c' to obtain the second parameter s' (n bits) for output.

$$s' \leftarrow w' \, xor \, c' = [w'_1 \, xor \, c'_1, w'_2 \, xor \, c'_2, \ldots, w'_n \, xor \, c'_n] \tag{71}$$

The message/second parameter/second verification key/second signature transmission part 126 in the signature generation apparatus 120 transmits the message M, the second parameter s' the second verification key v', and the second signature σ' to the signature conversion apparatus 140.

The differential key calculation part 145 in the signature conversion apparatus 140 computes bitwise exclusive OR (=t) of the first parameter s and the second parameter s':

$$t := sx \text{ or } s' \tag{72}$$

and decodes the bitwise exclusive OR (=t) to obtain the differential key Δ (step B6 in FIG. 8).

$$\Delta \leftarrow DEC(t) \tag{73}$$

Equation (72) is rewritten based on Equations (68) and (71) as follows:

$$\begin{aligned} t = s \, xor \, s' &= [w_1 \, xor \, c_1, \ldots, w_n \, xor \, c_n] \\ &xor \, [w'_1 \, xor \, c'_1, \ldots, w'_n \, xor \, c'_n] = [(w_1 \, xor \, c_1) \, xor \, (w'_1 \, xor \, c'_1), \\ &\ldots, (w_n \, xor \, c_n) \, xor \, (w'_n \, xor \, c'_n)] = [w_1 \, xor \, w'_1, \ldots, w_n \, xor \, w'_n] \\ &xor \, [c_1 \, xor \, c'_1, \ldots, c_n \, xor \, c'_n] = (w \, xor \, w') \, xor \, (ENC(x) \, xor \, ENC(x')) \end{aligned} \tag{74}$$

Since the linear code is used in Equation (74), Equation (72) is expressed as follows:

$$t = (w \, xor \, w') \, xor \, ENC(x \, xor \, x') \tag{75}$$

When a difference (Hamming distance) between the first biometric information w and the second biometric information w' is less than or equal to an error correction range (capability) D of the linear code, a distance between a codeword ENC (x xor x') and t is also less than or equal to D.

This is because the following holds $$ENC(x\ xor\ x')\ xor\ t = ENC(x\ xor\ x')\ xor\ ((w\ xor\ w')xor\ ENC(x\ xor\ x')) = w\ xor\ w' \quad (76)$$

A difference between the codeword ENC (x xor x') and t is equal to a difference (Hamming distance) between the first biometric information w and the second biometric information w'. Hence, (x xor x') is reconstructed from t by executing a reconstruction algorithm DEC(t), when a difference between t and the codeword ENC (x xor x') is less than or equal to D.

$$\Delta = (x\ xor\ x') \leftarrow DEC(t) \quad (77)$$

From above, it can be confirmed that the differential key Δ=x xor x' is correctly computed from a bitwise exclusive OR operation of the first parameter s and the second parameter s'.

Figure 15A:
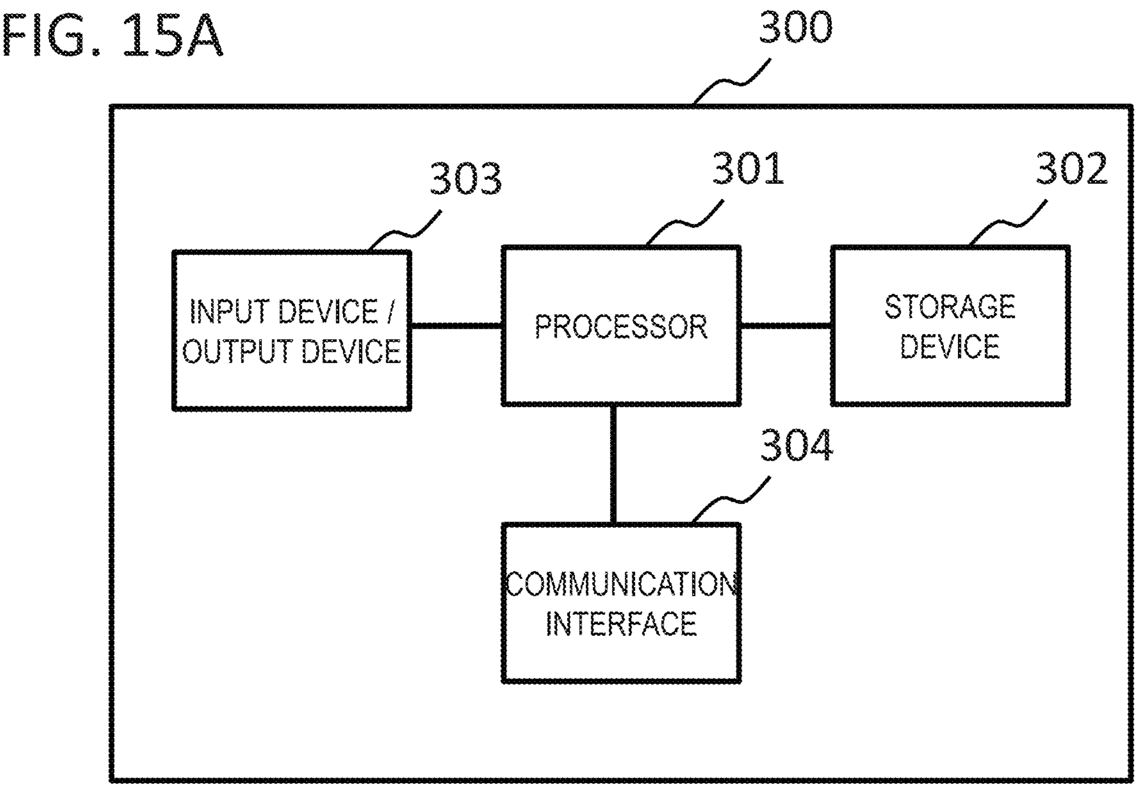
FIGS. 15A and 15B are diagrams illustrating one of implementation examples of the present disclosure.

FIG. 15A is a schematic diagram illustrating one of examples in which each apparatus (110, 120, 130, and 140) of the above digital signature system 100 is implemented on a computer that has communication functions and can be connected to each other via a network. In FIG. 15A, each apparatus (110, 120, 130, and 140) includes a processor 301, a storage device 302, an input device/output device 303, and a communication interface 304. Storage device 302 may be configured with a RAM (Random Access Memory), a ROM (Read Only Memory), or a semiconductor storage such as EEPROM (Electrically Erasable and Programmable ROM), HDD (Hard Disk Drive), CD (Compact Disc), DVD (Digital Versatile Disc), etc. a Disk Drive (HDD), a Compact Disc (CD), a Digital Versatile Disc (DVD), etc. The processor 301 executes programs (not shown) stored in the storage device 302 to realize processing and functions of each device. The input device/output device 303 may be configured with a keyboard and display. For example, the signature generation apparatus 120 may be configured to display the verification results (acceptance or non-acceptance) from the verification apparatus 130 on an output device such as a display. In the key generation apparatus 110 and/or the signature generation apparatus 120, which acquire biometric information, the input device/output device 303 may be configured with a sensor to acquire biometric information. In this case, the sensor may be an image sensor (camera) if the biometric information is a face, iris, etc., a fingerprint sensor if the biometric information is a fingerprint, or a LED (Light Emitting Diode) that emits near-infrared light and a near-infrared camera that captures light transmitted through the finger, for example, in the case of finger veins. The sensor may be a removable sensor, such as a Universal Serial Bus (USB) device. Communication interface 304 may include a network interface card, transceiver, etc., and may be configured to communicate with each other via LAN (Local Area Network), WAN (Wide Area Network) such as the Internet, wireless LAN, mobile communication network, etc. In the key generation apparatus 110, and/or the signature generation apparatus 120, the communication interface 304 may be configured to have an interface that communicates and connects to an external sensor (e.g., a sensor connected through Bluetooth (registered trademark), etc.) and receives biometric information acquired by the external sensor.

Figure 15B:
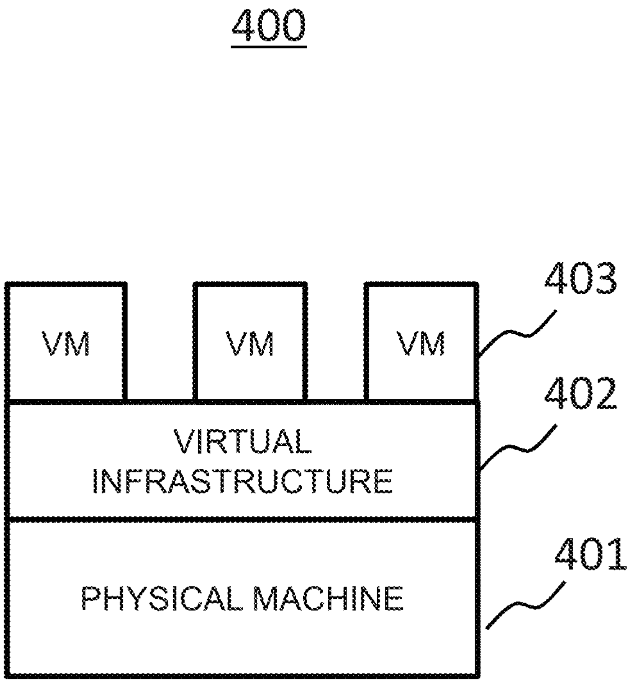

FIG. 15B schematically illustrates an example of implementing the apparatuses (110, 120, 130, and 140) in the digital signature system 100 described above as virtual machines using server virtualization technology. A plurality of virtual machines VMs 403 are able to run on a virtual infrastructure 402 such as a hypervisor implemented on a physical machine 401 of a server 400. One or more of the apparatuses in the digital signature system 100 (110, 120, 130, and 140) may be implemented as a virtual machine VM 403. It provides a virtual server environment with a plurality of servers running, although physically it is a single server. Each virtual machine VM 403 is preferably configured to operate in an isolated environment in memory space. In this case, in the virtual machine VM 403, the program that realizes the processing of one of the apparatuses (110, 120, 130, and 140) runs on a virtual OS (Operating System) on the virtual machine. The virtual machine VM that virtually realizes any of the apparatuses (110, 120, 130, and 140) may be configured to communicate and connect with other virtual machines via a virtual network, or it may be configured to communicate and connect with other apparatus(es) among the apparatuses (110, 120, 130, and 140) through a physical interface (communication interface) of the physical machine 401 via a LAN, WAN such as the Internet, etc.

In the above example embodiments, a system for processing based on biometric information is described as an example, but the present disclosure is not limited to biometric information and can also be realized using fuzzy information other than biometric information. For example, each aspect/example/embodiment described in the present disclosure may be applied to PUF (Physically Unclonable Function), etc. PUF is a physical duplication prevention function that identifies a semiconductor device (IC (Integrated Circuit) chip) and is a technology that uses individual differences that occur in the manufacturing process of IC chips, etc. to identify individuals (IC chips) like human fingerprints, for example.

Regarding Equations (38), (47), etc., an example using a square lattice coding scheme is described as a non-limiting example, but it is, as a matter of course, possible to use RS codes, BCH codes, or other error-correcting codes as the encoding. In addition, biometric information is not limited to real number vectors, but integer vectors may also be used, as a matter of course.

The above examples of the disclosure can partially or entirely be described as following Supplementary notes (Notes), though not limited thereto.

(Note 1) A digital signature system includes: a first processing apparatus that comprises at least a first processor and a first communication interface, wherein the first processing apparatus receives: a first parameter generated using a first signing key and first biometric information; a second parameter generated using a second signing key and second biometric information; and a second signature generated with the second signing key for a message, and the first processing apparatus, using at least the first parameter, the second parameter and the second signature, computes a first signature for the message that is able to be verified using a first verification key corresponding to the first signing key.

(Note 2) In the digital signature system according to Note 1, the first processing apparatus computes a differential key using the first parameter and the second parameter, the differential key being a difference between the first signing key and the second signing key, and the first processing apparatus computes the first signature using at least the differential key and the second signatur.

(Note 3) In the digital signature system according to Note 1, the first processing apparatus receives a second verification key corresponding to the second signing key and verifies a pair of the message and the second signature using the second verification key.

(Note 4) In the digital signature system according to Note 1, the first processing apparatus computes a differential key using the first parameter and the second parameter, the differential key being a difference between the first signing key and the second signing key, and the first processing apparatus computes a second verification key corresponding to the second signing key using the differential key and the first verification key.

(Note 5) In the digital signature system according to Note 1, the first signature is a signature with the first signing key for the message.

(Note 6) The digital signature system according to any one of Notes 1 to 5, includes: a second processing apparatus; and a third processing apparatus.

The second processing apparatus includes at least a second processor and a second communication interface.

The second processing apparatus performs processing of generating a pair of the first signing key and the first verification key corresponding to the first signing key; acquiring the first biometric information; generating the first parameter by composing the first signing key and the first biometric information; and transmitting the first parameter to the first processing apparatus.

The third processing apparatus includes at least a third processor and a third communication interface.

The third processing apparatus performs processing of acquiring the second biometric information; generating a pair of the second signing key and a second verification key corresponding to the second signing key; generating the second parameter by composing the second signing key and the second biometric information; generating the second signature for the message using the second signing key; and transmitting the message, the second parameter, and the second signature to the first processing apparatus.

(Note 7) In the digital signature system according to Note 6, the second processing apparatus transmits the first verification key to an apparatus that verifies a signature, or a Key-server, and the first processing apparatus transmits the first signature to the apparatus that verifies a signature.

(Note 8) A signature conversion apparatus includes at least one processor; a memory storing program instructions executable by the at least one processor; and a communication interface. The processor, when executing the program instructions, performs processing comprising:

receiving a first parameter generated using a first signing key and first biometric information; receiving, as a signature including a parameter, a second parameter generated using a second signing key and second biometric information, and a second signature that is a digital signature generated with the second signing key for a message, together with the message; converting the second signature to a first signature using the first parameter and the second parameter, the first signature being a signature for the message that is able to be verified using a first verification key corresponding to the first signing key; and transmitting the first signature, as a signature not including a parameter that depends on biometric information, to a node that verifies the first signature using the first verification key.

(Note 9) A digital signature method, includes:

receiving, by a first node, a first parameter generated using a first signing key and first biometric information;

receiving, by the first node, a second parameter generated using a second signing key and second biometric information; and a second signature generated with the second signing key for a message; and using at least the first parameter, the second parameter, and the second signature, computing, by the first node, a first signature for the message that is able to be verified using a first verification key corresponding to the first signing key.

(Note 10) The digital signature method according to Note 9, includes:

computing, by the first node, a differential key using the first parameter and the second parameter, the differential key being a difference between the first signing key and the second signing key, and computing, by the first node, the first signature using at least the differential key and the second signature.

(Note 11) The digital signature method according to Note 9 or 10, includes: receiving, by the first node, a second verification key corresponding to the second signing key and verifying, by the first node, a pair of the message and the second signature using the second verification key.

(Note 12) The digital signature method according to any one of Notes 9 to 11, includes: computing, by the first node, a differential key using the first parameter and the second parameter, the differential key being a difference between the first signing key and the second signing key, and computing, by the first node, a second verification key corresponding to the second signing key using the differential key and the first verification key.

(Note 13) In the digital signature method according to any one of Notes 9 to 12, the first signature is a signature with the first signing key for the message.

(Note 14) The digital signature method according to any one of Notes 9 to 13 includes: generating, by a second node, a pair of the first signing key and the first verification key corresponding to the first signing key; acquiring, by the second node, the first biometric information; generating, by the second node, the first parameter by composing the first signing key and the first biometric information; transmitting, by the second node, the first parameter to the first node; acquiring, by a third node, the second biometric information; generating, by the third node, a pair of the second signing key and a second verification key corresponding to the second signing key; generating, by the third node, the second parameter by composing the second signing key and the second biometric information; generating, by the third node, the second signature for the message using the second signing key; and transmitting, by the third node, the message, the second parameter, and the second signature to the first node.

(Note 15) A non-transitory computer-readable medium storing a program causing a computer to execute processing comprising:

receiving a first parameter generated using a first signing key and first biometric information;

receiving, as a signature including a parameter, a second parameter generated using a second signing key and second biometric information, and a second signature that is a digital signature generated with the second signing key for a message, together with the message;

converting the second signature to a first signature using the first parameter and the second parameter, the first signature being a signature for the message that is able to be verified using a first verification key corresponding to the first signing key; and transmitting the first signature, as a signature not including a parameter that depends on biometric information, to a node that verifies the first signature using the first verification key.

[reference literature 1] Yevgeniy Dodis, et al. "Fuzzy Extractors: How to Generate Strong Keys from Biometrics and Other Noisy Data," SIAM Journal on Computing, 38 (1): 97-139, 2008

[reference literature 2] David Derler, et al., "Key-Homomorphic Signatures: Definitions and Applications to Multiparty Signatures and Non-Interactive Zero-Knowledge," Designs, Codes and Cryptography 87, 1372-1413, 2019

[reference literature 3] Japanese Unexamined Patent Application Publication No. 2021-087167 A The disclosure of each of PTLs 1 and reference literature 1 to 3 is incorporated herein by reference thereto. Variations and adjustments of the examples are possible within the scope of the overall disclosure (including the claims) based on the basic technical concept. Various combinations and selections of examples and disclosed elements (including the elements in each of the claims, examples, drawings, etc.) are possible within the scope of the claims of the present application. That is, the present disclosure includes various variations and modifications that could be made by those skilled in the art according to the overall disclosure including the claims and the technical concept.

What is claimed is:

1. A digital signature system comprising:

a first processing apparatus that includes at least a first processor and a first communication interface, wherein the first processing apparatus is configured to execute processing comprising:

receiving a first parameter generated using a first signing key and first biometric information;

receiving a second parameter generated using a second signing key and second biometric information, and a second signature generated with the second signing key for a message;

computing a difference between the first signing key and the second signing key, using the first parameter and the second parameter; and computing a first signature for the message by converting the second signature to the first signature, using a Key homomorphic operation function that takes, as inputs, at least the difference between the first signing key and the second signing key and the second signature, and outputs a signature for the message generated with the second signing key shifted by the difference, equivalent to the first signature, wherein the first signature is able to be verified using a first verification key corresponding to the first signing key.

2. The digital signature system according to claim 1, wherein the first processing apparatus is configured to execute processing comprising:

computing a differential key that is a difference between the first signing key and the second signing key, using the first parameter and the second parameter; and computing the first signature, using at least the differential key and the second signature.

3. The digital signature system according to claim 1, wherein the first processing apparatus is configured to execute processing comprising:

receiving a second verification key corresponding to the second signing key; and verifying the second signature for the message using the second verification key, before computing the first signature for the message.

4. The digital signature system according to claim 1, wherein the first processing apparatus is configured to execute processing comprising:

computing a differential key that is a difference between the first signing key and the second signing key, using the first parameter and the second parameter; and computing a second verification key corresponding to the second signing key, using the differential key and the first verification key.

5. The digital signature system according to claim 1, wherein the first signature is a signature with the first signing key for the message.

6. The digital signature system according to claim 1, further comprising:

a second processing apparatus including at least a second processor and a second communication interface; and a third processing apparatus including at least a third processor and a third communication interface, wherein the second processing apparatus is configured to execute processing comprising:

generating the first signing key and the first verification key corresponding to the first signing key;

acquiring the first biometric information;

generating the first parameter by composing the first signing key and the first biometric information; and transmitting the first parameter to the first processing apparatus, wherein the third processing apparatus is configured to execute processing comprising:

acquiring the second biometric information;

generating the second signing key and a second verification key corresponding to the second signing key;

generating the second parameter by composing the second signing key and the second biometric information;

generating the second signature for the message using the second signing key; and transmitting the message, the second parameter, and the second signature to the first processing apparatus.

7. The digital signature system according to claim 6, wherein the second processing apparatus transmits the first verification key to a verification apparatus that verifies a signature or to a Key-server, and the first processing apparatus transmits the first signature to the verification apparatus.

8. A signature conversion apparatus comprising:

at least one processor;

a memory storing program instructions executable by the at least one processor; and a communication interface, wherein the at least one processor, when executing the program instructions, performs processing comprising:

receiving a first parameter generated using a first signing key and first biometric information;

receiving, as a signature including a parameter, a second parameter generated using a second signing key and second biometric information, and a second signature that is a digital signature generated with the second signing key for a message, together with the message;

computing a difference between the first signing key and the second signing key, using the first parameter and the second parameter:

converting the second signature to a first signature using a Key homomorphic operation function that takes, as inputs, at least the difference between the first signing key and the second signing key and the second signature, and outputs a signature for the message generated with the second signing key shifted by the difference, equivalent to the first signature, the first signature being a signature for the message that is able to be verified using a first verification key corresponding to the first signing key; and transmitting the first signature, as a signature not including a parameter that depends on biometric information, to a node that verifies the first signature using the first verification key.

9. A digital signature method comprising:

receiving, by a first node, a first parameter generated using a first signing key and first biometric information;

receiving, by the first node, a second parameter generated using a second signing key and second biometric information; and a second signature generated with the second signing key for a message; and computing a difference between the first signing key and the second signing key, using the first parameter and the second parameter; and computing, by the first node, a first signature for the message, by using a Key homomorphic operation function that takes, as inputs, at least the difference between the first signing key and the second signing key and the second signature and outputs a signature for the message generated with the second signing key shifted by the difference, equivalent to the first signature, converting the second signature to the first signature, that is able to be verified using a first verification key corresponding to the first signing key.

10. The digital signature method according to claim 9, comprising:

computing, by the first node, a differential key that is a difference between the first signing key and the second signing key, using the first parameter and the second parameter; and computing, by the first node, the first signature, using at least the differential key and the second signature.

11. The digital signature method according to claim 9, comprising:

receiving, by the first node, a second verification key corresponding to the second signing key and verifying, by the first node, the second signature for the message, using the second verification key, before computing the first signature for the message.

12. The digital signature method according to claim 9, comprising:

computing, by the first node, a differential key that is a difference between the first signing key and the second signing key, using the first parameter and the second parameter; and computing, by the first node, a second verification key corresponding to the second signing key, using the differential key and the first verification key.

13. The digital signature method according to claim 9, wherein the first signature is a signature with the first signing key for the message.

14. The digital signature method according to claim 9, comprising:

generating, by a second node, the first signing key and the first verification key corresponding to the first signing key;

acquiring, by the second node, the first biometric information;

generating, by the second node, the first parameter by composing the first signing key and the first biometric information;

transmitting, by the second node, the first parameter to the first node;

acquiring, by a third node, the second biometric information;

generating, by the third node, the second signing key and a second verification key corresponding to the second signing key;

generating, by the third node, the second parameter by composing the second signing key and the second biometric information;

generating, by the third node, the second signature for the message, using the second signing key; and transmitting, by the third node, the message, the second parameter, and the second signature to the first node.

15. A non-transitory computer-readable medium storing a program causing a computer to execute processing comprising:

receiving a first parameter generated using a first signing key and first biometric information;

receiving, as a signature including a parameter, a second parameter generated using a second signing key and second biometric information, and a second signature that is a digital signature generated with the second signing key for a message, together with the message;

computing a difference between the first signing key and the second signing key, using the first parameter and the second parameter;

converting the second signature to a first signature using a Key homomorphic operation function that takes, as inputs, at least the difference between the first signing key and the second signing key and the second signature, and outputs a signature for the message generated with the second signing key shifted by the difference, equivalent to the first signature, the first signature being a signature for the message that is able to be verified using a first verification key corresponding to the first signing key; and transmitting the first signature, as a signature not including a parameter that depends on biometric information, to a node that verifies the first signature using the first verification key.

* * * * *